US012386398B2

(12) United States Patent
Choi et al.

(10) Patent No.: US 12,386,398 B2
(45) Date of Patent: Aug. 12, 2025

(54) ELECTRONIC DEVICE COMPRISING DISPLAY AND SCREEN OPERATION METHOD THEREOF

(71) Applicant: SAMSUNG ELECTRONICS CO., LTD., Suwon-si (KR)

(72) Inventors: Yunjeong Choi, Suwon-si (KR); Yongkwon Kim, Suwon-si (KR); Sangheon Kim, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/096,298

(22) Filed: Jan. 12, 2023

(65) Prior Publication Data

US 2023/0152862 A1 May 18, 2023

Related U.S. Application Data

(63) Continuation of application No. PCT/KR2021/010285, filed on Aug. 4, 2021.

(30) Foreign Application Priority Data

Aug. 4, 2020 (KR) .................. 10-2020-0097420

(51) Int. Cl.
*G06F 1/16* (2006.01)
(52) U.S. Cl.
CPC .......... *G06F 1/1677* (2013.01); *G06F 1/1616* (2013.01); *G06F 1/1694* (2013.01);
(Continued)
(58) Field of Classification Search
CPC .... G06F 1/1677; G06F 1/1616; G06F 1/1694; G06F 2200/1614; G06F 2200/1637
(Continued)

(56) References Cited

U.S. PATENT DOCUMENTS 9,001,149 B2 4/2015 Sirpal et al.
9,952,743 B2 4/2018 Sirpal et al.
(Continued)

FOREIGN PATENT DOCUMENTS

CN 108874041 11/2018
CN 110399078 11/2019
(Continued)

OTHER PUBLICATIONS

International Search Report for PCT/KR2021/010285 mailed Nov. 18, 2021, 5 pages.
(Continued)

*Primary Examiner* — Mark Edwards
(74) *Attorney, Agent, or Firm* — Nixon & Vanderhye, P.C.

(57) ABSTRACT

Disclosed is an electronic device comprising: a display, a sensor configured to detect geometric deformation of the electronic device, at least one processor, and a memory operatively connected to the at least one processor and storing at least one application. The memory may include one or more instructions which, when executed, cause the at least one processor to: control the display to display an execution screen of the at least one application on the display in response to execution of the at least one application in the memory; check a rotation mode setting of the electronic device; obtain display characteristic information of the display in response to a geometric deformation event detected by the sensor; determine a display mode of the execution screen based on the display characteristic information and the checked rotation mode setting and map same to the at least one application; and control the display to display the execution screen on the display based on the mapped display mode.

20 Claims, 17 Drawing Sheets

(52) U.S. Cl.
CPC ............... *G06F 2200/1614* (2013.01); *G06F 2200/1637* (2013.01)

(58) Field of Classification Search
USPC ........................................................ 345/158
See application file for complete search history.

(56) References Cited

U.S. PATENT DOCUMENTS

| | | | |
|---|---|---|---|
| 9,977,465 | B2 | 5/2018 | Lee |
| 10,175,726 | B2 | 1/2019 | Lee et al. |
| 10,268,338 | B2 | 4/2019 | Sirpal et al. |
| 10,409,540 | B2 | 9/2019 | Cho et al. |
| 10,866,694 | B2 | 12/2020 | Kim et al. |
| 11,209,865 | B2 | 12/2021 | Jung et al. |
| 11,262,800 | B2 | 3/2022 | Kim et al. |
| 2015/0331593 | A1* | 11/2015 | Lee ................... G06F 1/1641 345/667 |
| 2016/0034597 | A1* | 2/2016 | Graf ................... G06F 9/461 715/761 |
| 2018/0039410 | A1* | 2/2018 | Kim ................... G06F 1/1652 |
| 2019/0034147 | A1 | 1/2019 | Koki et al. |
| 2019/0065031 | A1* | 2/2019 | Kang ................. G06F 3/04817 |
| 2020/0128116 | A1 | 4/2020 | Jang et al. |
| 2020/0192432 | A1* | 6/2020 | Yee ..................... G06F 1/1641 |
| 2021/0173533 | A1 | 6/2021 | Kim et al. |
| 2022/0113767 | A1 | 4/2022 | Jung et al. |

FOREIGN PATENT DOCUMENTS

| | | |
|---|---|---|
| KR | 2011133861 A * | 12/2011 |
| KR | 10-2015-0008982 | 1/2015 |
| KR | 10-1481425 | 1/2015 |
| KR | 10-1649156 | 8/2016 |
| KR | 10-2017-0093658 | 8/2017 |
| KR | 10-2018-0023284 | 3/2018 |
| KR | 10-2019-0031870 | 3/2019 |
| KR | 10-2020-0002686 | 1/2020 |
| KR | 10-2020-0037761 | 4/2020 |
| KR | 10-2020-0086830 | 7/2020 |

OTHER PUBLICATIONS

Written Opinion of the ISA for PCT/KR2021/010285 mailed Nov. 18, 2021, 4 pages.

Office Action dated May 31, 2025 in Korean Application No. 10-2020-0097420 and English-language translation.

* cited by examiner

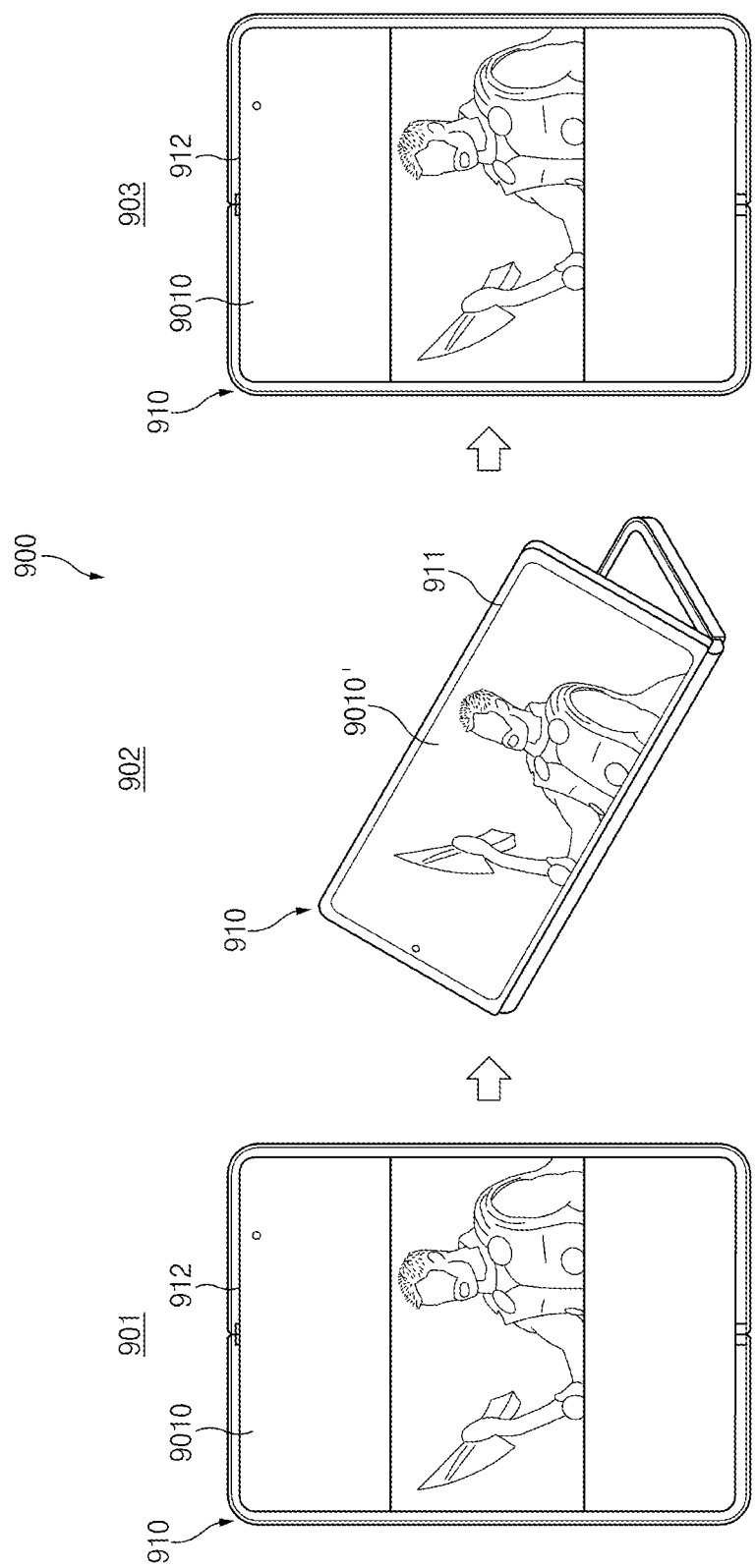

ELECTRONIC DEVICE COMPRISING DISPLAY AND SCREEN OPERATION METHOD THEREOF

CROSS-REFERENCE TO RELATED APPLICATIONS

This application is a continuation of International Application No. PCT/KR2021/010285 designating the United States, filed on Aug. 4, 2021, in the Korean Intellectual Property Receiving Office and claiming priority to Korean Patent Application No. 10-2020-0097420, filed on Aug. 4, 2020, in the Korean Intellectual Property Office, the disclosures of which are incorporated by reference herein in their entireties.

BACKGROUND

Field

The disclosure relates to an electronic device including a display and a screen operation method thereof.

Description of Related Art

An electronic device including a flexible display is provided in various form factors. A scheme where the shape of the electronic device is deformed according to the form factor of the electronic device may vary from infolding, outfolding, rolling, or sliding. A display used to display content may be changed or the size of the display may be changed, according to the scheme where the shape is deformed.

In the past, there was no product of a form factor which provides a mode for displaying content on an external display (e.g., a liquid crystal display (LCD)) in a V-shaped form where an electronic device including a foldable display (hereinafter referred to as a foldable electronic device) is not fully folded or unfolded when the foldable electronic device is in-folded.

SUMMARY

Embodiments of the disclosure provide an electronic device that addresses a problem in which the screen is vertically fixed and displayed although the foldable electronic device changes to a mode for displaying content on the display in a V-shaped form where the foldable electronic device is not fully folded or unfolded (hereinafter referred to as a flex mode) as the foldable electronic device is folded, when a screen rotation setting is a portrait fixing mode in a state where the foldable electronic device is fully unfolded.

Embodiments of the disclosure provide an electronic device that addresses a problem in which the foldable electronic device does not provide a home screen in a landscape mode in a mode for displaying content on an external display among the flex modes.

Embodiments of the disclosure provide an electronic device that addresses a problem in which the foldable electronic device does not provide a lock screen in a landscape mode, upon screen timeout (when an inactivity state of the display is maintained during a specified time) while the foldable electronic device runs the application in a flex tent mode.

According to an example embodiment, an electronic device is provided. The electronic device may include: a display, a sensor configured to sense geometric deformation of the electronic device, at least one processor, and a memory operatively connected with the at least one processor to store at least one application. The memory may include one or more instructions which, when executed, cause the at least one processor to: control the display to display an execution screen of the at least one application on the display in response to execution of the at least one application stored in the memory, identify a setting of a rotation mode of the electronic device, obtain display feature information of the display in response to a geometric deformation event sensed by the sensor, determine a display mode of the execution screen, based on the display feature information and the identified setting of the rotation mode, and map the determined display mode to the at least one application, and control the display to display the execution screen on the display based on the mapped display mode.

According to an example embodiment, a screen operation method of an electronic device including a display is provided. The screen operation method may include: displaying an execution screen of at least one application on the display in response to execution of the at least one application, identifying a setting of a rotation mode of the electronic device, obtaining display feature information of the display in response to a geometric deformation event sensed by a sensor, determining a display mode of the execution screen, based on the display feature information and the identified setting of the rotation mode and mapping the determined display mode to the at least one application, and displaying the execution screen on the display based on the mapped display mode.

According to various example embodiments disclosed in the disclosure, the electronic device may provide the screen in a landscape mode as the electronic device changes to a flex mode to improve user experience, when a screen rotation setting is a portrait fixing mode in a state where the foldable electronic device is fully unfolded.

Furthermore, according to various example embodiments disclosed in the disclosure, the electronic device may provide a home screen in the landscape mode particularly in a mode for displaying content on an external display among the flex modes of the foldable electronic device, thus improving user experience.

Furthermore, according to various example embodiments disclosed in the disclosure, the electronic device may provide a lock screen in the landscape mode, when the screen timed out while the foldable electronic device runs the application in a flex tent mode, thus improving user experience.

In addition, various effects ascertained directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 9A, 9B and 9C are diagrams illustrating an example operation of an electronic device set through a user interface shown in FIG. 8 according to various embodiments;

With regard to description of drawings, the same or similar reference numbers may be used for the same or similar components.

DETAILED DESCRIPTION

Figure 1:
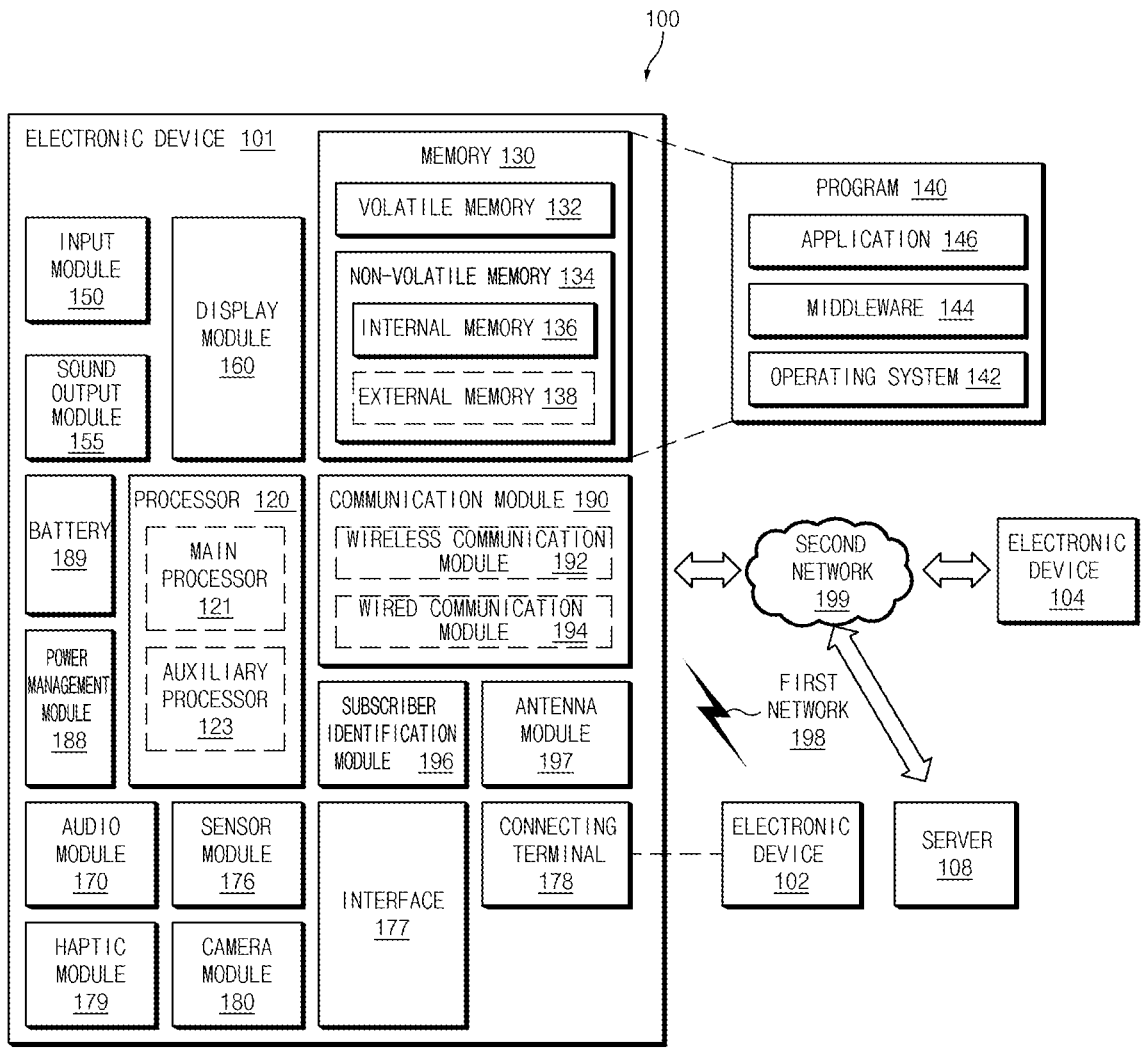
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an example embodiment, the electronic device may be a foldable electronic device including a foldable display. Hereinafter, a description will be given of a fully folded state and a fully unfolded state of the foldable electronic device.

Figure 2:
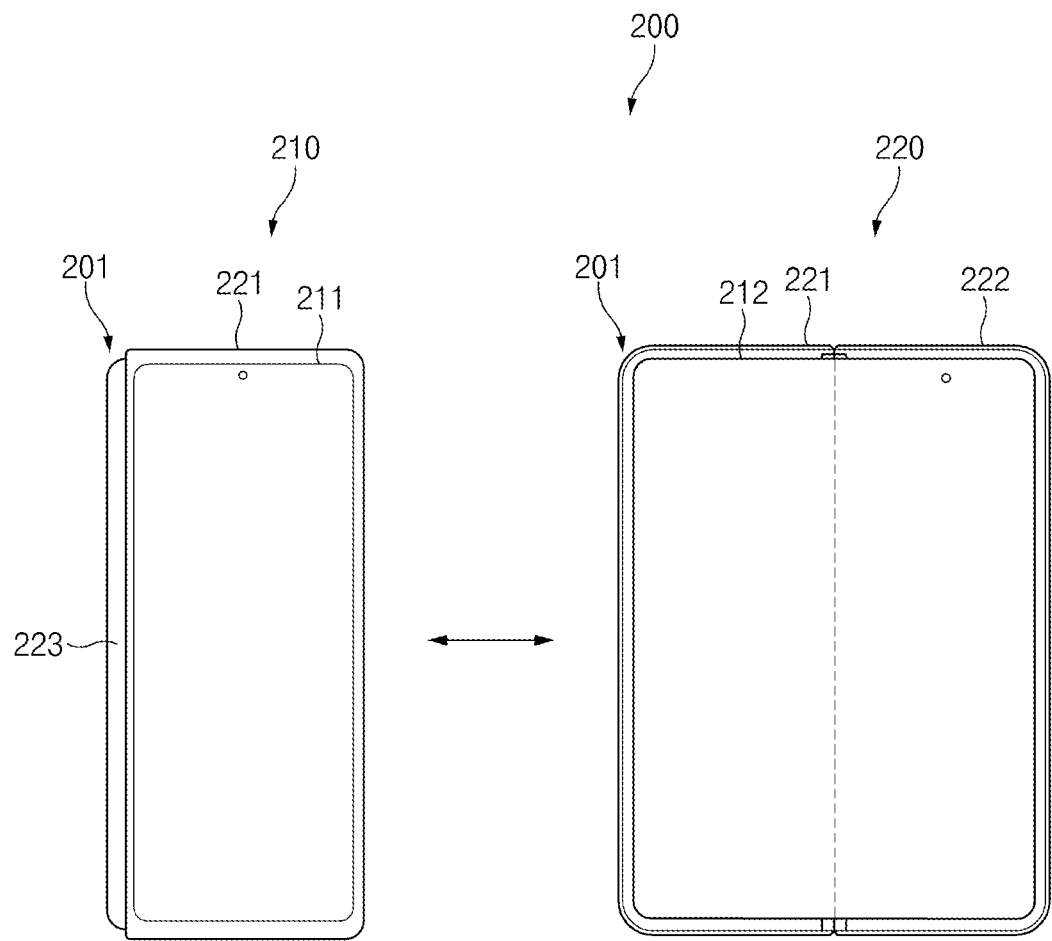
FIG. 2 is a diagram illustrating a fully folded state and a fully unfolded state of a foldable electronic device according to various embodiments.

FIG. 2 is a diagram 200 illustrating a fully folded state and a fully unfolded state of a foldable electronic device according to various embodiments.

Referring to FIG. 2, an electronic device 201 (e.g., an electronic device 101 of FIG. 1) may include a first housing 221, a second housing 222, and a hinge 223. According to an embodiment, the first housing 221 and the second housing 222 may be connected by the hinge 223. According to an embodiment, the first housing 221 and the second housing 222 may be geometrically deformed as mutual arrangement around the hinge 223 varies. For example, the first housing 221 and the second housing 222 may be arranged at a specific angle of greater than or equal to 0° and less than or equal to 180° around the hinge 223. Hereinafter, an operation of the electronic device 201, in which the specific angle formed by the first housing 221 and the second housing 222 decreases, may be referred to as a folding operation, and an operation of the electronic device 201, in which the specific angle increases, may be referred to as an unfolding operation.

According to an embodiment, the electronic device 201 may include a first display 211 and a second display 212. According to an embodiment, the first display 211 may be disposed on the first housing 221, and the second display 212 may be disposed on the first housing 221 and the second housing 222. According to an embodiment, the first display 211 and the second display 212 may be arranged on the first housing 221 and the second housing 222 to face in an opposite direction to each other.

According to an embodiment, the second display 212 may be provided as a flexible display. According to an embodiment, the second display 212 may be folded by the folding operation of the electronic device 201 and may be unfolded by the unfolding operation of the electronic device 201.

A first drawing 210 of FIG. 2 is a diagram illustrating a state where the electronic device 201 is fully folded. A second drawing 220 of FIG. 2 is a diagram illustrating a state where the electronic device 201 is fully unfolded. According to an embodiment, an angle formed by the first housing 221 and the second housing 222 is 0 degree in the state where the electronic device 201 is fully folded, and an angle formed by the first housing 221 and the second housing 222 is 180 degrees in the state where the electronic device 201 is fully unfolded.

Referring to the first drawing 210 of FIG. 2, the electronic device 201 may display content using the first display 211 in the fully folded state. Referring to the second drawing 220 of FIG. 2, the electronic device 201 may display content using the second display 212 in the fully unfolded state. Although not illustrated in FIG. 2, the electronic device 201 may display content using at least one of the first display 211 or the second display 212 depending on the angle formed by the first housing 221 and the second housing 222. According to an embodiment, the electronic device 201 may display an execution screen of an application, a home screen, a lock screen, or an always on display (AOD) screen on the first display 211 and the second display 212 by means of a processor (e.g., a processor 120 of FIG. 1) of the electronic device 201.

Hereinafter, a description will be given of a flex mode of the foldable electronic device 201 with reference to FIG. 3.

Figure 3:
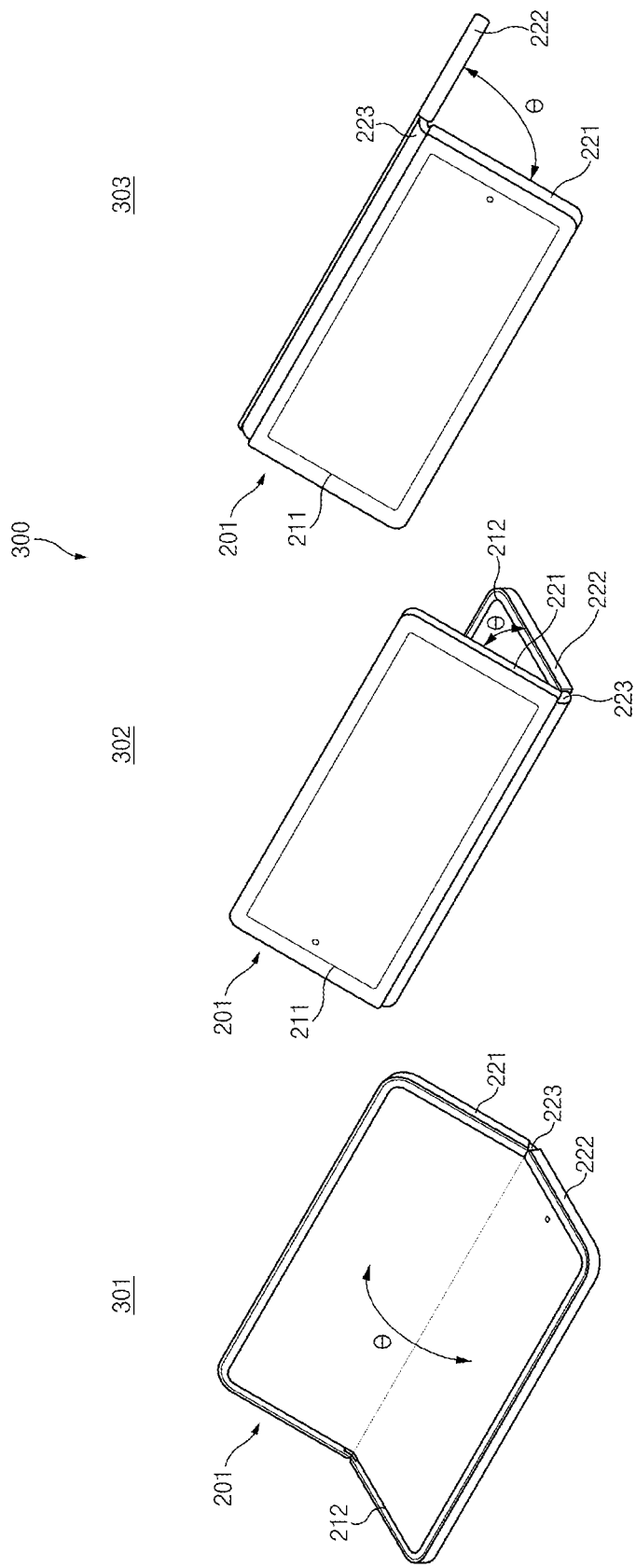
FIG. 3 is a diagram illustrating various example perspective views of a flex mode of a foldable electronic device according to various embodiments.

FIG. 3 is a diagram 300 illustrating perspective views of various examples of a flex mode of an electronic device according to various embodiments.

Referring to FIG. 3, as an electronic device 201 is folded or unfolded, an angle θ formed by a first housing 221 and a second housing 222 may be changed. According to an embodiment, the angle formed by the first housing 221 and the second housing 222 may be otherwise referred to as a folding angle of the electronic device 201 or a folding angle of the second display 212. According to an embodiment, the flex mode of the electronic device 201 may refer to a state where the folding angle belongs to a specified angle range of greater than 0 degree and less than 180 degrees. According to an embodiment, the flex mode may be a half-folded state or a partially folded state, rather than a fully folded state in a first drawing 210 of FIG. 2 and a fully unfolded state in a second drawing 220 of FIG. 2.

According to an embodiment, the electronic device 201 may be used in a state, such as a first state 301 or a second state 302, where one surface of the second housing 222 is placed on a flat surface such as a table. According to an embodiment, the electronic device 201 may determine whether to use a first display 211 or the second display 212 depending on the folding angle. According to an embodiment, the electronic device 201 may display content using the second display 212, when it is greater than or equal to a specified angle like the first state 301, and may display the content using the first display 211, when it is less than the specified angle like the second state 302. In various embodiments of the disclosure, a flex mode of the second state 302 may be referred to as a flex cover mode.

According to an embodiment, the electronic device 201 may be used in a state, such as a third state 303, where an edge parallel to an edge connected with the hinge 223 among four edges surrounding a display of the first housing 221 and an edge parallel to an edge connected with the hinge 223 among four edges surrounding a display of the second housing 222 are placed on a flat surface such as a table. According to an embodiment, the electronic device 201 may display content using the first display 211, the display area of which is visible to the outside, like the third state 303. In various embodiments of the disclosure, a flex mode of the third state 303 may be referred to as a flex tent mode.

According to an embodiment, the edge connected with the hinge 223 among the edges of the first housing 221 may be placed on the bottom and the edge parallel to the edge connected with the hinge 223 may be placed on the top in the flex cover mode. The edge connected with the hinge 223 among the edges of the first housing 221 may be placed on the top and the edge parallel to the edge connected with the hinge 223 may be placed on the bottom in the flex tent mode. For example, when displaying a screen in a landscape mode in the flex mode, the electronic device 201 may change from the flex cover mode to the flex tent mode or may change from the flex tent mode to the flex cover mode, thus inverting and displaying the screen displayed on the first display 211.

Hereinafter, a description will be given of a configuration and an operation of an example electronic device according to an embodiment with reference to FIG. 4.

Figure 4:
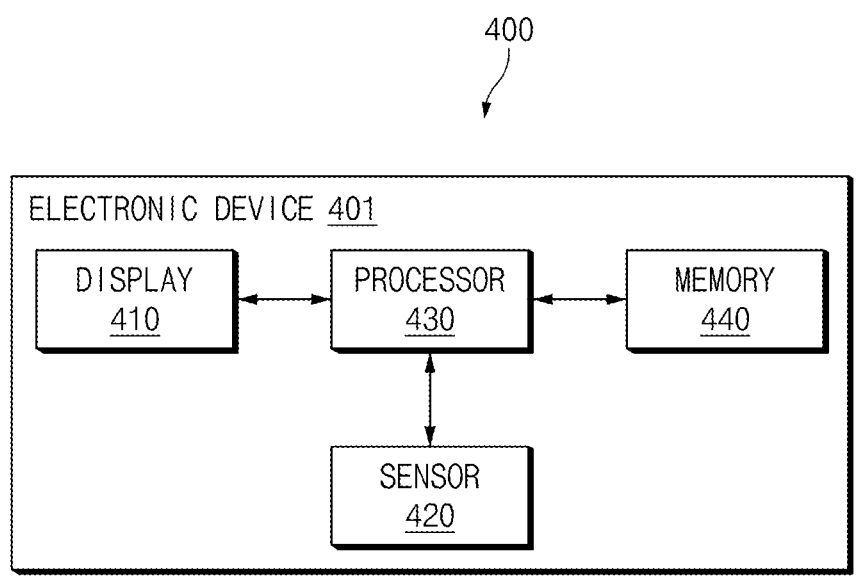
FIG. 4 is a block diagram illustrating an example configuration of the electronic device according to various embodiments.

FIG. 4 is a block diagram 400 illustrating an example configuration of an electronic device according to various embodiments.

Referring to FIG. 4, an electronic device 401 (e.g., an electronic device 101 of FIG. 1 or an electronic device 201 of FIG. 2) may include a display 410 (e.g., a display module 160 of FIG. 1, a first display 211 of FIG. 2, or a second display 212 of FIG. 2), a sensor 420 (e.g., a sensor module 176 of FIG. 1), a processor (e.g., including processing circuitry) 430 (e.g., a processor 120 of FIG. 1), and a memory 440 (e.g., a memory 130 of FIG. 1).

According to an embodiment, the display 410 may include a flexible display. For example, the display 410 may include a foldable display, a rollable display, or a slidable display. Hereinafter, a description will be given of an embodiment where the display 410 is the foldable display.

According to an embodiment, the display 410 may include a first display (e.g., a first display 211 of FIG. 2) and a second display (e.g., a second display 212 of FIG. 2). According to an embodiment, the second display may be a foldable display folded or unfolded according to a folding operation or an unfolding operation of the electronic device 401. Because the structure, the folding operation, and the unfolding operation of the electronic device 401 including the first display and the second display, the folding angle of the second display, and the various folding states according to the folding angle was described above with reference to FIGS. 2 and 3, a duplicated description will be brief or omitted.

According to an embodiment, the sensor 420 may sense geometric deformation of the electronic device 401. According to an embodiment, the geometric deformation may refer, for example, to a shape or a structure of the electronic device 401 being changed according to structural motion of the electronic device 401. According to an embodiment, a geometric deformation event sensed by means of the sensor 420 by the electronic device 401 may occur as the shape or the structure of the electronic device 401 is changed and may include at least one of, for example, folding, unfolding, rotation, or a change in size of the display 410.

For example, the sensor 420 may be at least one of a magnetic sensor including a hall sensor, a proximity sensor, an illumination sensor, a touch sensor, a gyro sensor, a bending sensor, an acceleration sensor, or an infrared sensor or a combination thereof.

According to an embodiment, the sensor 420 may be provided in a hinge structure (e.g., a hinge 223 of FIG. 2) to sense a folding operation or an unfolding operation of the electronic device 401.

According to an embodiment, the sensor 420 may sense rotation of the electronic device 401 based on a change in direction (e.g., landscape or portrait) where the electronic device 401 is placed.

According to an embodiment, when the display 410 may include a rollable display or a slidable display, the sensor 420 may sense a change in size of the display 410. According to an embodiment, that the size of the display 410 is changed may refer, for example, to a display area of the display 410 being expanded or reduced. For example, for the rollable display, a magnetic substance may be provided in a cylindrical structure (e.g., a roll) which is an axis on which the display 410 is wound, and a magnetic sensor may be disposed on the display 220. According to an embodiment, the electronic device 401 may detect a change in size of the display 410 based on the signal sensed by the magnetic sensor disposed on the display 410. A description will be given of operations performed by the electronic device 401 as the sensor 420 of the electronic device 401 senses the change in size of the display 410 will be described below with reference to FIG. 11.

According to an embodiment, the processor 430 may be operatively connected with the display 410 and the sensor 420. According an embodiment, the processor 430 may include various processing circuitry and process information or may control the sensor 420, based on the signal sensed by the sensor 420. According an embodiment, the processor 430 may output the processed information on the display 410. According to an embodiment, the processor 430 may receive a user input, such as a touch input, by means of the display 410 (e.g., a touch screen display).

According to an embodiment, the processor 430 may obtain feature information of the display 410 based on the geometric deformation event sensed by the sensor 420. The feature information of the display 410 may include at least one of, for example, a folding angle of the display 410, a rotation state of the display 410, a size of the display 410, a horizontal length of the display 410, a vertical length of the display 410, or an aspect ratio of the display 410.

For example, the processor 430 may identify a folding angle of the second display based on the signal sensed by the sensor 420. According to an embodiment, the processor 430 may determine a folding state of the electronic device 401 based on the identified folding angle. The folding state may include, for example, a fully folded state shown in FIG. 2, a fully unfolded state shown in FIG. 2, and various flex modes shown in FIG. 3. According to an embodiment, the processor 430 may determine that the electronic device 401 is in a fully folded state (or a fully closed state) when the folding angle is 0 degree, may determine that the electronic device 401 is a fully unfolded state (or a fully open state) when the folding angle is 180 degrees, and may determine that the electronic device 401 is a flex mode (or a partially folded state) when the folding angle belongs to a specified range of greater than 0 degree and less than 180 degrees.

According to an embodiment, the processor 430 may determine to switch between the first display and the second display based on the folding angle. For example, the processor 430 may display content using the second display, when the folding angle is greater than or equal to a specified angle, and may display the content using the first display, when the folding angle is less than the specified angle. For example, the processor 430 may identify that it switches to the second display, when the folding angle is greater than or equal to the specified angle, and may identify that it switches to the first display, when the folding angle is less than the specified angle. Referring to FIG. 3, the processor 430 may identify the switching between the first display and the second display to identify that a flex mode of a first state 301 changes to a flex mode (a flex cover mode) of a second state 302 or a flex mode (or a flex tent mode) of a third state 303 or vice versa.

According to an embodiment, the processor 430 may identify a mounted state of the electronic device 401 based on the signal sensed by the sensor 420. The processor 430 may identify whether the electronic device 401 is in, for example, a flex cover mode (the second state 302 of FIG. 3) or a flex tent mode (a third state 303 of FIG. 3). For example, when displaying a screen in a landscape mode, the processor 430 may invert and display a screen displayed on the first display depending on identifying that the flex cover mode changes to the flex tent mode or that the flex tent mode changes to the flex cover mode.

According to an embodiment, the processor 430 may identify a rotation state of the electronic device 401 based on the signal sensed by the sensor 420. The rotation state may include, for example, a state where the width of the electronic device 401 is longer than its height and a state where the height of the electronic device 401 is longer than the width. According to an embodiment, the processor 430 may determine a display mode of the screen displayed on the display 410 by the electronic device 401 based on the identified rotation state. According to an embodiment, the display mode may refer to a setting of a direction in which the screen is displayed and may include, for example, a landscape mode in which the screen is displayed in a form where the horizontal length of the screen is longer than a vertical length thereof and a portrait mode in which the screen is displayed in a form where the vertical length of the screen is longer than the horizontal length. According an embodiment, the processor 430 may determine the display mode as the landscape mode to correspond to the rotation state of the electronic device 401, when the rotation state of the electronic device 401 is a state where width is long, and may determine the display mode as the portrait mode to correspond to the rotation state of the electronic device 401, when the rotation state of the electronic device 401 is a state where height is long.

According to an embodiment, the processor 430 may identify a setting of a rotation mode of the electronic device 401. According to an embodiment, the setting of the rotation mode of the electronic device 401 may be a setting about whether to change the display mode of the electronic device 401 based on the rotation of the electronic device 401, which is sensed by the sensor 420. The setting of the rotation mode of the electronic device 401 may include, for example, an auto rotation mode for changing the display mode based on the rotation of the electronic device 401 and a portrait fixing mode for fixing the display mode to the portrait mode.

According to an embodiment, when the setting of the rotation mode of the electronic device 401 is the auto rotation mode, the processor 430 may change the display mode from the portrait mode to the landscape mode or from the landscape mode to the portrait mode in response to the rotation of the electronic device 401, which is sensed by the sensor 420. According to an embodiment, when the setting of the rotation mode of the electronic device 401 is the portrait fixing mode, the processor 430 may fix and set the display mode to only the portrait mode irrespective of the rotation of the electronic device 401. For example, in the portrait fixing mode, the processor 430 may determine the display mode as the portrait mode even when the rotation state of the electronic device 401 is a state where width is longer than height.

As described above, the processor 430 may determine the display mode of the screen based on the setting of the rotation mode. According to various embodiments of the disclosure, the processor 430 may determine a display mode of the screen based on the display feature information and the setting of the rotation mode and may map the determined display mode to at least one application which is running According to various embodiments, the processor 430 may basically determine the display mode depending on the setting of the rotation mode, but may differently determine the display mode depending on identifying that the geometric state of the electronic device 401 is changed based on the display feature information (e.g., the folding angle).

For example, as the folding operation or the unfolding operation is sensed by the sensor 420, the processor 430 may obtain a folding angle of the display 410. As it is determined that the folding angle belongs to a specified range of greater than 0 degree and less than 180 degrees, the processor 430 may determine the display mode as the landscape mode. When the folding angle belongs to the specified range of greater than 0 degree and less than 180 degrees, the electronic device 401 may be in, for example, a flex mode shown in FIG. 3. According to an embodiment, when the electronic device 401 is folded or unfolded to change to the flex mode, the processor 430 may determine the display mode as the landscape mode.

According to an embodiment, when the screen rotation setting of the electronic device 401 is the portrait fixing mode, the processor 430 may display a screen in the portrait mode in the fully unfolded state or the fully folded state, but may change the display mode of the screen to the landscape mode depending on identifying that the fully unfolded state or the fully folded state changes to the flex mode.

According to an embodiment, when the screen rotation setting of the electronic device 401 is the portrait fixing mode, the processor 430 may determine the display mode as the portrait mode as it is determined that the folding angle deviates from the specified range of greater than 0 degree and less than 180 degrees. According an embodiment, when the electronic device 401 is folded or unfolded to release the flex mode, the processor 430 may change the display mode as the portrait mode.

According to an embodiment, when the screen rotation setting of the electronic device 401 is the auto rotation mode, the processor 430 may display the screen in a display mode determined based on a rotation state of the electronic device 401 in the fully unfolded state or the fully folded state, but may display the screen in the landscape mode irrespective of the rotation state of the electronic device 401 as it is identified that the fully unfolded state or the fully folded state changes to the flex mode.

According to an embodiment, when the screen rotation setting of the electronic device 401 is the portrait fixing mode, the processor 430 may determine the display mode based on the rotation state of the electronic device 401 as it is determined that the folding angle deviates from the specified range of greater than 0 degree and less than 180 degrees. According an embodiment, when the electronic device 401 is folded or unfolded to release the flex mode, the processor 430 may determine the display mode based on the rotation state. For example, the processor 430 may display the screen in the landscape mode, when the flex mode is released and the rotation state of the electronic device 401 is a state where width is longer than height, and may display the screen in the portrait mode, when the flex mode is released and the rotation state of the electronic device 401 is a state where height is longer than width.

According to an embodiment, the processor 430 may perform a mapping operation of applying the determined display mode (e.g., the landscape mode or the portrait mode) of the screen to a screen displayed on the display 410. For example, the processor 430 may resize the screen displayed on the display 410 depending on the determined display mode of the screen. According to an embodiment, the processor 430 may display the resized screen on the display 410 depending on the mapped display mode.

According to an embodiment, the screen displayed on the display 410 by the electronic device 401 may be, but is not limited to, an execution screen of at least one application stored in a memory 440 to be described below, which may further include at least one of, for example, a home screen, a lock screen, or an always on display (AOD) screen.

According to an embodiment, the processor 430 may determine a display mode of at least one of an execution screen of at least one application, a home screen, a lock screen, an AOD screen, or a voice call screen as the landscape mode as it is determined that the folding angle belongs to the specified range of greater than 0 degree and less than 180 degrees.

According to an embodiment, the memory 440 may be operatively connected with the processor 430. The memory 440 may store one or more instructions causing the processor 430 to perform the above-mentioned operations. According to an embodiment, the memory 440 may store at least one application run by the processor 430.

According to various embodiments of the disclosure, the electronic device 401 may change the display mode of the screen to the landscape mode or the portrait mode in response to a geometric deformation event (e.g., folding, unfolding, or a change in size of the display 410) of the electronic device 401 to provide a screen optimized for a specified geometric state of the electronic device 401, thus improving user experience.

Hereinafter, a description will be given of a configuration and an operation of a software module of an electronic device according to various embodiments with reference to FIG. 5.

Figure 5:
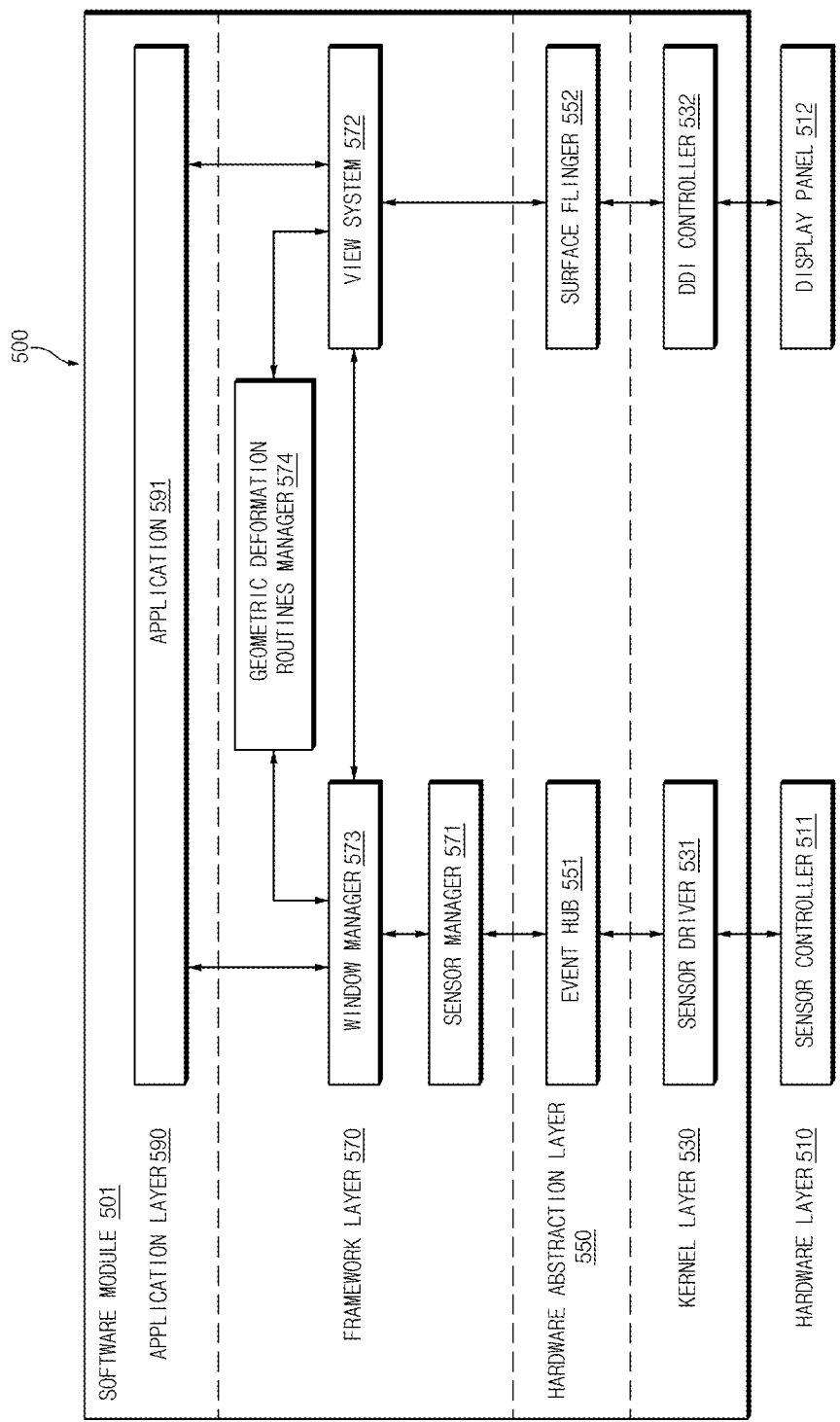
FIG. 5 is a block diagram illustrating an example configuration of a software module of an electronic device according to various embodiments.

FIG. 5 is a block diagram 500 illustrating an example configuration of a software module of an electronic device according to various embodiments. Operations of a software module 501, which will be described below, may be performed by an electronic device (e.g., an electronic device 401 of FIG. 4) or a processor (e.g., a processor 430 of FIG. 4) of the electronic device.

Referring to FIG. 5, the software module 501 may include a kernel layer 530, a hardware abstraction layer (HAL) 550, a framework layer 570, and an application layer 590. The software module 501 may obtain information based on at least one hardware module included in the hardware layer 510 and may control the at least one hardware module.

According to an embodiment, the hardware layer 510 may include a sensor controller 511 (e.g., a sensor module 176 of FIG. 1 or a sensor 410 of FIG. 4) and a display panel 512 (e.g., a display module 160 of FIG. 1 or a display 410 of FIG. 4).

According to an embodiment, the software module 501 may identify a state of the electronic device or a change in the state based on the sensor controller 511. For example, when the display panel 512 is a foldable display panel, the software module 501 may identify a folding state of the electronic device based on the sensor controller 511. For another example, when the display panel 512 is a rollable display panel, the software module 501 may identify a size of the display based on the sensor controller 511.

According to an embodiment, the software module 501 may display content (e.g., an execution screen of an application 591 or the like) on the display panel 512.

According to an embodiment, the kernel layer 530 may include various drivers for controlling various hardware modules included in the electronic device. For example, the kernel layer 530 may include a sensor driver 531. The sensor driver 531 may include an interface module which controls the sensor controller 511.

According to an embodiment, the kernel layer 530 may include a display driver integrated chip (DDI) controller 532. The DDI controller 532 may process a control signal for driving the display panel 512 and may deliver the processed signal to the display panel 512. According to an embodiment, the DDI controller 532 may correspond to a display driver integrated circuit.

According to an embodiment, the hardware abstraction layer (HAL) 550 may refer to an abstracted layer between a plurality of hardware modules included in the hardware layer and the software module of the electronic device. For example, the hardware abstraction layer 550 may include an event hub 551 and a surface flinger 552.

According to an embodiment, the event hub 551 may include an interface module which standardizes an event which occurs in a sensor module (e.g., the sensor controller 511) such as a touch module.

According to an embodiment, the surface flinger 552 may synthesize a plurality of layers. According an embodiment, the surface flinger 552 may provide the DDI controller 532 with data indicating the plurality of synthesized layers. According to an embodiment, the layer may include a window. According an embodiment, the surface flinger 552 may synthesize a plurality of windows and may provide the DDI controller 532 with data indicating the plurality of synthesized windows, thus supporting a multi-window mode of the electronic device.

According to an embodiment, the framework layer 570 may perform a function of connecting the application layer 590 with the hardware abstraction layer 550. For example, the framework layer 570 may include a sensor manager 571, a view system 572, a window manager 573, and a geometric deformation routines manager (GDRM) 574.

According to an embodiment, the sensor manager 571 may include a module which controls a sensor (e.g., the sensor controller 511) based on availability of the sensor in the application 591.

According to an embodiment, when the change in the state of the electronic device is identified by means of the sensor module (e.g., the sensor controller 511), the window manager 573 may deliver information of a display area of the display (e.g., the display panel 512) corresponding to the changed state of the electronic device to the application 591. For example, the information of the display area of the display may include resolution, a size, an aspect ratio, or the like and may be included in the display feature information described above with reference to FIG. 4.

According to an embodiment, when the change in the state of the electronic device is identified, the window manager 573 may deliver the display feature information to an application, continuity of which is set, among one or more applications which are running According to an embodiment, the window manager 573 may deliver the display feature information to the view system 572.

According to an embodiment, when the change in the geometric state of the electronic device is identified, the window manager 573 may deliver the display feature information to the geometric deformation routines manager 574. The display feature information delivered to the geometric deformation routines manager 574 may include at least one of, for example, a folding angle, a rotation state, a size, a horizontal length, a vertical length, or an aspect ratio of the display 410.

According to an embodiment, the view system 572 may draw at least one layer based on resolution of the display area of the display (e.g., the display panel 512). For example, the view system 572 may generate at least one window based on the resolution of the display area of the display (e.g., the display panel 512).

According to an embodiment, the geometric deformation routines manager 574 may include a module for controlling the screen in response to geometric deformation of the electronic device 401. For example, the geometric deformation routines manager 574 may determine a display mode of an execution screen of the at least one application, a home screen, a lock screen, an AOD screen, or a voice call screen as the landscape mode or the portrait mode and may provide the view system 572 with the display mode. According to an embodiment, the geometric deformation routines manager 574 may determine the display mode of the screen based on the display feature information delivered from the window manager 573.

According to an embodiment, the application layer 590 may include the one or more applications 591. According to an embodiment, the application 591 may draw at least one layer based on the resolution of the display area of the display (e.g., the display panel 512) using at least one drawing library (e.g., the view system 572). For example, the application 591 may generate at least one window to which an execution screen of the application 591 is mapped by means of the view system 572.

Hereinafter, a description will be given of an operation of an electronic device according to an according to an example embodiment with reference to FIG. 6.

Figure 6:
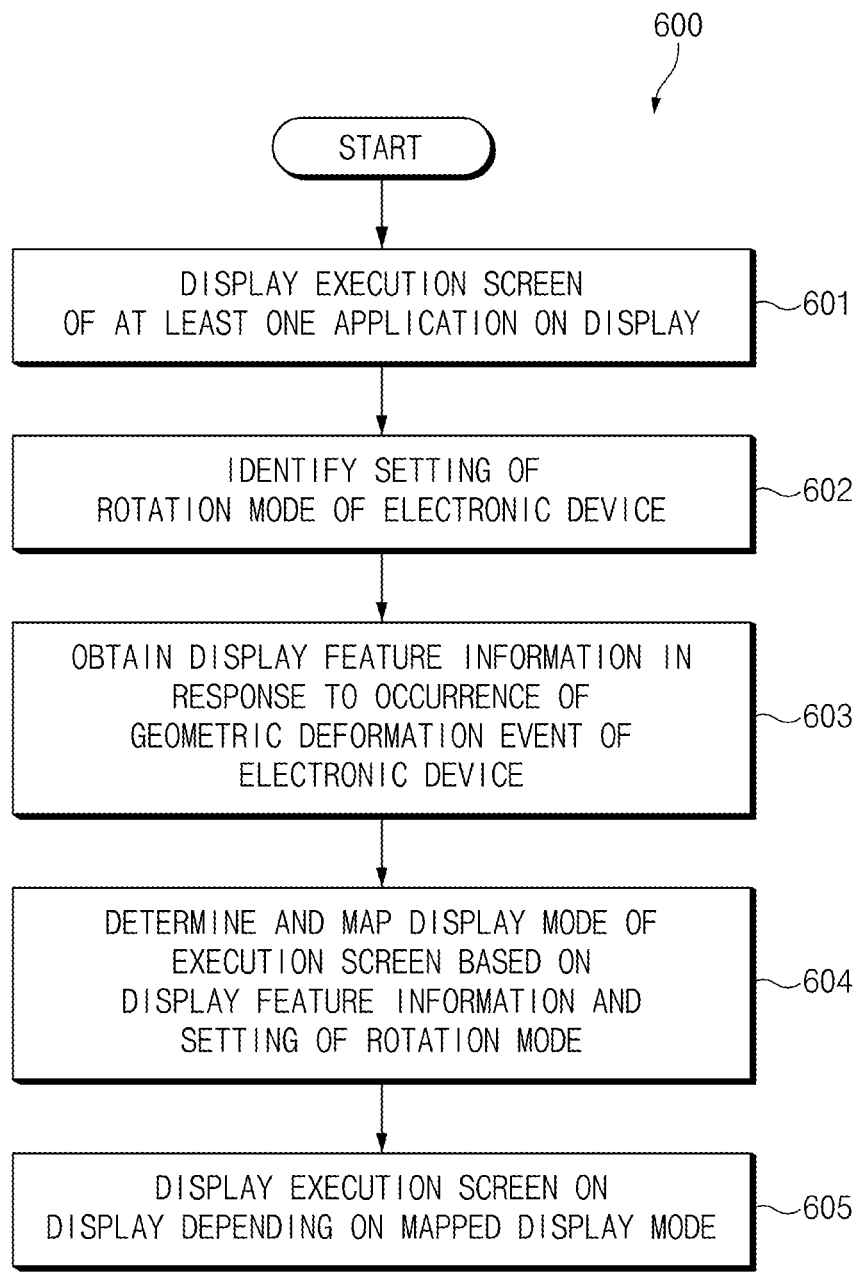
FIG. 6 is a flowchart illustrating an example operation of an electronic device according to various embodiments.

FIG. 6 is a flowchart 600 illustrating an example operation of an electronic device according to an embodiment. Operations of an electronic device (e.g., an electronic device 401 of FIG. 4), which will be described below, may be performed by a processor (e.g., a processor 430 of FIG. 4) of an electronic device (e.g., an electronic device 401 of FIG. 4).

In operation 601, the electronic device may display an execution screen of at least one application stored in a memory (e.g., a memory 440 of FIG. 4) on a display (e.g., a display 410 of FIG. 4). According to an embodiment, the electronic device may display an execution screen (or a user interface) of the at least one application on the display in response to the execution of the at least one application. For example, the at least one application may include at least one of a camera application, a home application, a gallery application, or a memo application.

According an embodiment, the electronic device may provide execution screens of a plurality of applications in a multi-window mode in response to the execution of the plurality of applications. The multi-window mode may refer to a function of splitting and using one screen into a plurality of screens. In the multi-window mode, the electronic device may provide an N-split screen (where N is a natural number) or one or more pop-up screens. A description will be given of an embodiment in which the electronic device provides the execution screens of the plurality of applications in the multi-window mode with reference to FIG. 10.

In operation 602, the electronic device may identify a setting of a rotation mode of the electronic device. According to an embodiment, the electronic device may identify whether the setting of the rotation mode of the electronic device is an auto rotation mode or a portrait fixing mode. When the electronic device is in the auto rotation mode, it may change the display mode of the execution screen of the at least one application, which is displayed on the display, to a landscape mode or a portrait mode depending on the change in rotation state (landscape/portrait) of the electronic device. When the electronic device is in the portrait fixing mode, it may display the display mode of the execution screen of the at least one application in the portrait mode in a fixed manner, without changing the display mode of the execution screen of the at least one application, which is displayed on the display, depending on the change in rotation state (landscape/portrait) of the electronic device.

According to an embodiment, the electronic device may store the setting of the rotation mode of the electronic device. For example, the electronic device may store state information of the electronic device, which is about whether it is in the auto rotation mode or the portrait fixing mode. For example, the electronic device may store state information of the electronic device, which is about whether the rotation state of the electronic device is a state where width is longer than height or a state where height is longer than width in a first state before a geometric deformation event occurs.

In operation 603, the electronic device may obtain display feature information in response to occurrence of the geometric deformation event of the electronic device. According to an embodiment, the geometric deformation event may include at least one of folding, unfolding, rotation, or a change in size of the display. According to an embodiment, the electronic device may detect the geometric deformation event by means of a sensor (e.g., a sensor 420 of FIG. 4).

For example, an electronic device including a foldable display may obtain folding angle information depending on detecting a folding operation or an unfolding operation by means of the sensor. According to an embodiment, a foldable electronic device 201 shown in FIGS. 2 and 3, may further obtain switching information between a first display 211 (an external display) and a second display 212 (an internal display) based on the folding angle information. For example, the electronic device 201 may identify that it switches to the second display 212, when the folding angle is greater than or equal to a specified angle, and may identify that it switches to the first display 211, when the folding angle is less than the specified angle.

For another example, an electronic device including a rollable display or a slidable display may obtain size information of the display depending on detecting a change in size of the display by means of the sensor.

According to an embodiment, the electronic device may detect rotation of the electronic device by means of the sensor. For example, the electronic device may change the display mode of the screen to the landscape mode depending on detecting rotation from a state where width is longer than height to a state where the height is longer than the width in the auto rotation mode and may change the display mode of the screen to the portrait mode depending on detecting rotation from the state where the height is longer than the width to the state where the width is longer than the height.

In operation 604, the electronic device may determine and map a display mode of the execution screen of the at least one application based on the display feature information and the setting of the rotation mode. For example, the electronic device may identify a folding state based on the folding angle. For example, when the folding angle belongs to a specified range of greater than 0 degree and less than 180 degrees, the electronic device may identify whether the electronic device is in a flex mode. According to an embodiment, the folding state of the electronic device, such as the flex mode, may be included in the display feature information. According to an embodiment, the electronic device may determine the display mode of the execution screen of the at least one application as the landscape mode depending on identifying that the electronic device is in the flex mode.

For another example, when the folding angle deviates from the specified range of greater than 0 degree and less than 180 degrees, the electronic device may identify whether the flex mode of the electronic device is released. According to an embodiment, that the flex mode of the electronic device is released may refer, for example, to the electronic device changing to a fully unfolded state or a fully folded state. According to an embodiment, the electronic device may determine the display mode of the execution screen of the at least one application based on the rotation mode setting depending on identifying that the flex mode of the electronic device is released. For example, the electronic device may determine the display mode of the execution screen of the at least one application as the portrait mode, when the flex mode of the electronic device is released in the portrait fixing mode, and may determine the display mode of the execution screen of the at least one application as the landscape mode or the portrait mode depending on the rotation state of the electronic device, when the flex mode of the electronic device is released in the auto rotation mode.

According to an embodiment, the electronic device may map the determined display mode to the at least one application. For example, the electronic device may determine state information of the at least one application to display a screen in the landscape mode when the electronic device is in the flex mode.

In operation 605, the electronic device may display the display mode of the execution screen of the at least one application on the display depending (e.g., based) on the mapped display mode. For example, when the electronic device is in the flex mode, it may display the execution screen of the at least one application, which is displayed on the display, in the landscape mode.

The method for controlling the display mode of the execution screen in response to the geometric deformation when the electronic device displays the execution screen of the at least one application is described in the above embodiment, but not limited thereto. Even when displaying a home screen, the lock screen, an AOD screen, or a voice call screen, the electronic device may control a display mode of each screen in response to geometric deformation.

Hereinafter, a description will be given by comparing a conventional electronic device with an electronic device according to an example embodiment with reference to FIGS. 7A, 7B, 7C, 7D and 7E.

FIGS. 7A, 7B, 7C, 7D and 7E are diagrams comparing a conventional electronic device 701 with an electronic device 702 according to various embodiments. The conventional electronic device 701 and the electronic device 702 according to an embodiment, which will be described below, may have a form factor of a foldable electronic device 201 shown in FIGS. 2 and 3. Operations of the electronic device 702 (e.g., an electronic device 401 of FIG. 4) according to an embodiment, which will be described below, may be performed by a processor (e.g., a processor 430 of FIG. 4) of the electronic device 702.

Figure 7A:
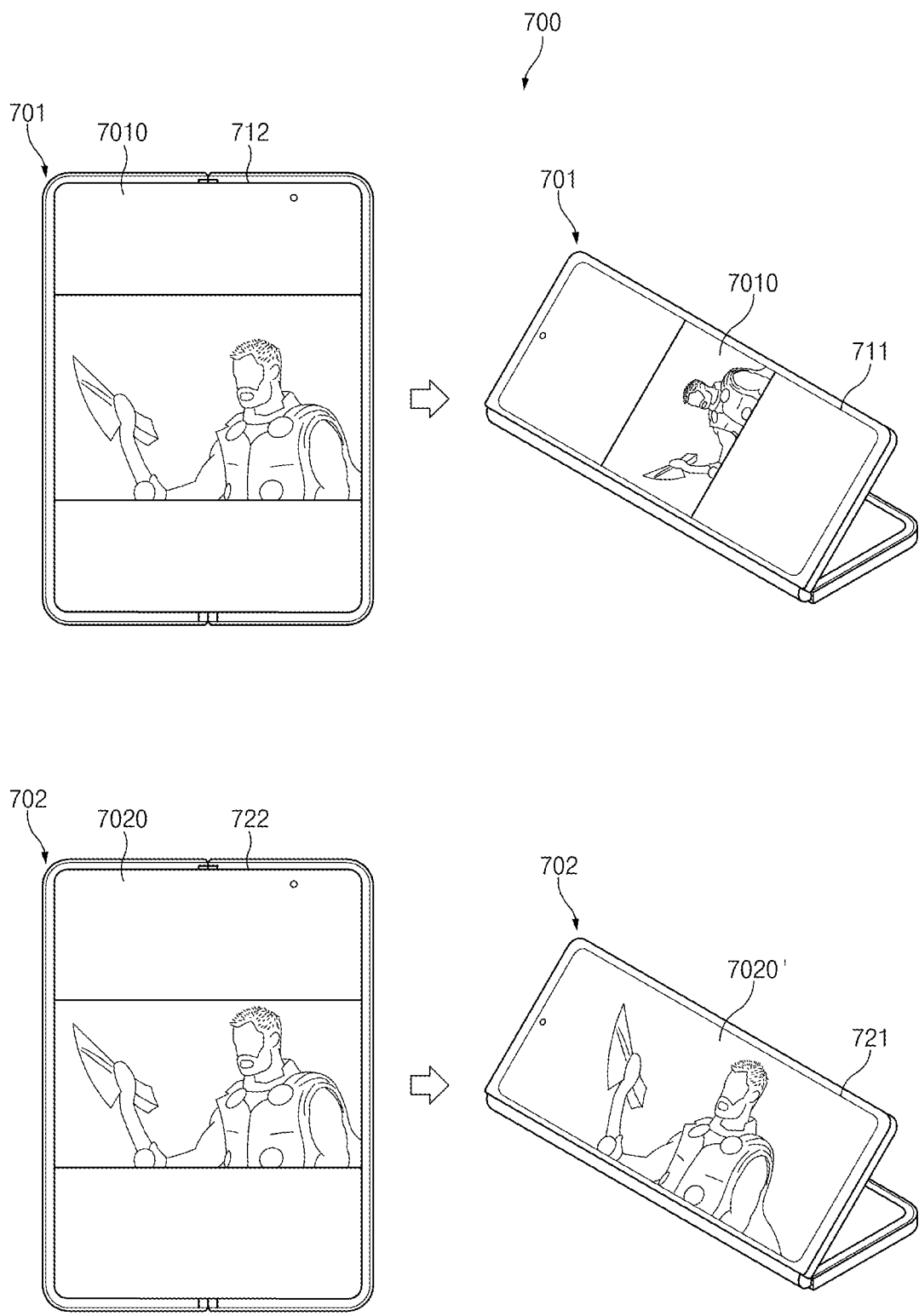
FIGS. 7A, 7B, 7C, 7D and 7E are diagrams comparing a conventional electronic device with a foldable electronic device according to various embodiments.

FIG. 7A is a diagram 700 comparing methods for displaying screens as a conventional electronic device and an electronic device detect a geometric deformation event while displaying an execution screen of an application according to various embodiments. It is assumed that settings of rotation modes of the conventional electronic device 701 and the electronic device 702 according to an embodiment, which are shown in FIG. 7A, are a portrait fixing mode.

Referring to FIG. 7A, the electronic device 701 may be displaying an execution screen 7010 of an application (e.g., a video playback application) on a second display 712 in a portrait mode in a fully unfolded state. The electronic device 701 may change to a flex mode as it is folded in the fully unfolded state. As the electronic device 701 is folded over a specified angle, it may turn off the second display 712 and may turn on a first display 711. The electronic device 701 may display the execution screen 7010 of the application on the first display 711 depending on a continuity principle of the application. As the setting of the rotation mode of the electronic device 701 is the portrait fixing mode, the electronic device 701 may display the execution screen 7010 of the application in a portrait mode even in the flex mode.

Referring to FIG. 7A, the electronic device 702 according to an embodiment may be displaying an execution screen 7020 of an application (e.g., a video playback application)

on a second display 722 in a fully unfolded state. The electronic device 702 according to an embodiment may obtain folding angle information depending on detecting the folding operation of the electronic device 702 and may identify that the electronic device 702 changes to the flex mode based on the folding angle. As the electronic device 702 according to an embodiment is folded over the specified angle, it may turn off the second display 722 and may turn on a first display 721. For example, the electronic apparatus 702 may be in a flex cover mode. The electronic device 702 according to an embodiment may display an execution screen 7020' of the application on the first display 721 depending on the continuity principle of the application. As the electronic device 702 according to an embodiment changes to the flex mode, it may display the execution screen 7020' of the application in a landscape mode.

The case where the electronic device 702 displays the execution screen 7020 of the application is described as an example in the above-mentioned embodiment, but not limited thereto. Even when the electronic device 702 changes to the flex mode while displaying a home screen, a lock screen, an AOD screen, or a voice call screen in a fully unfolded state, it may display the home screen, the lock screen, the AOD screen, or the voice call screen in the landscape mode.

FIG. 7A illustrates that the flex mode of the electronic device 702 is the flex cover mode, but not limited thereto. The flex mode of the above-mentioned electronic device 702 may include a flex tent mode or a flex mode for displaying content using the second display 722.

According to an embodiment, because it is common practice that a user mounts the electronic device 702 in a form where the width of the electronic device 702 is longer than the height of the electronic device 702 to use the electronic device 702 when the electronic device 702 is in the flex mode, the electronic device 702 may change the execution screen of the at least one application to the landscape mode depending on identifying a change to the flex mode even when an original setting of the rotation mode of the electronic device 702 is the portrait fixing mode, thus removing inconvenience where the user should separately change the setting of the rotation mode and improving user experience.

Figure 7B:
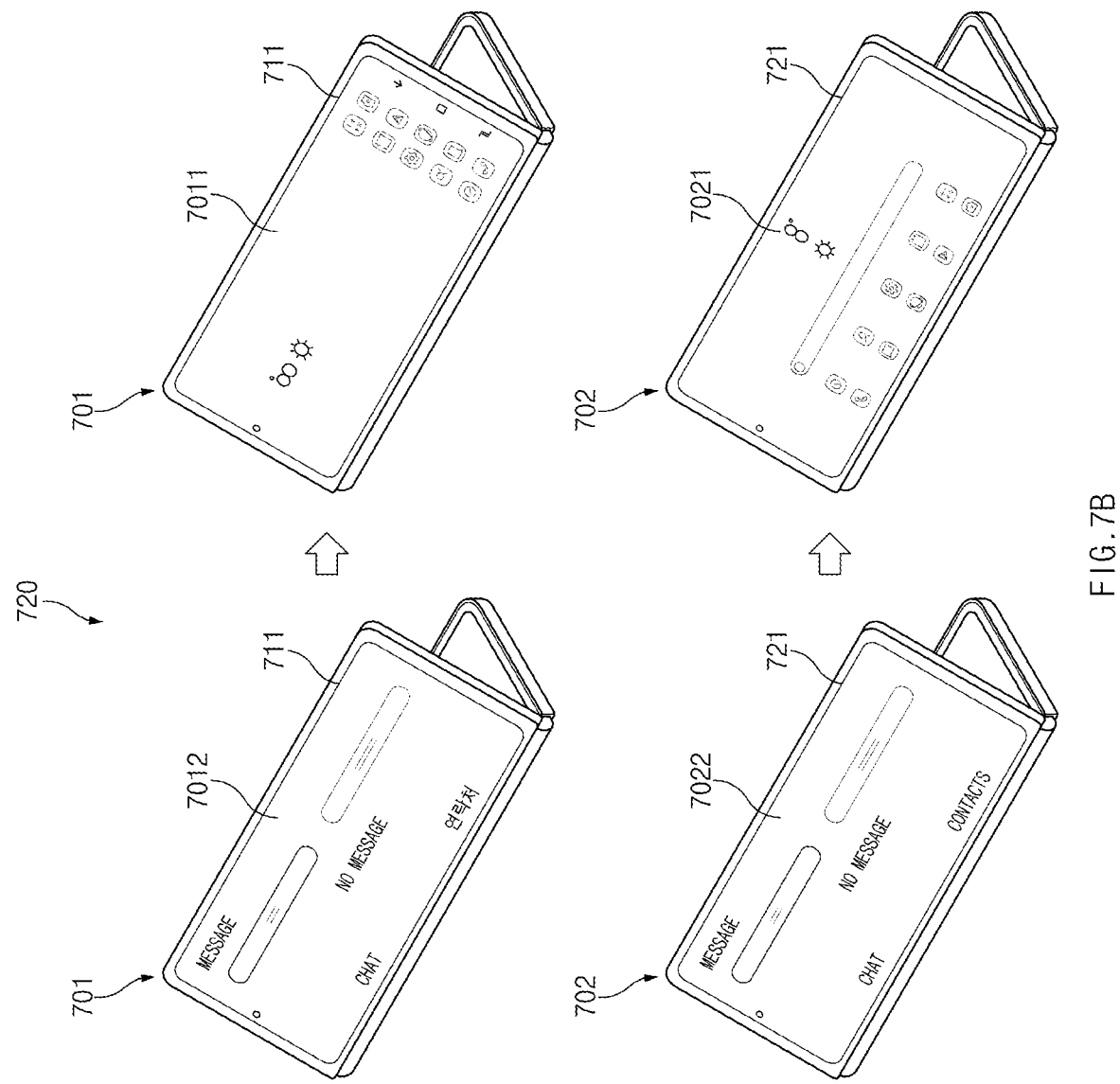

FIG. 7B is a diagram 720 comparing methods for displaying home screens as a conventional electronic device and an electronic device display an execution screen of an application in a flex mode and end the display of the execution screen of the application according to various embodiments.

Referring to FIG. 7B, the electronic device 701 may be displaying an execution screen 7012 of an application (e.g., a message application) on a first display 711 in the landscape mode in the flex mode. The electronic device 701 may end the display of the execution screen 7012 of the application, which is displayed on the first display 711, based on a user input for ending the display of the execution screen 7012 of the application, and may display a home screen 7011 on the first display 711. Because the conventional electronic device 701 does not support the landscape mode of the home screen in the flex mode, it may display the home screen 7011 on the first display 711 in the portrait mode.

Referring to FIG. 7B, the electronic device 702 according to an embodiment may be displaying an execution screen 7020 of an application (e.g., a message application) on a first display 721 in the landscape mode in the flex mode. According to an embodiment, the electronic device 702 may end the display of the execution screen 7022 of the application, which is displayed on the first display 721, based on a user input for ending the display of the execution screen 7022 of the application, and may display a home screen 7021 on the first display 721. The electronic device 702 according to an embodiment may display the home screen 7021 on the first display 711 in the landscape mode depending on identifying that the electronic device 702 is in the flex mode.

FIG. 7B illustrates that the flex mode of the electronic device 702 is the flex cover mode, but not limited thereto. The flex mode of the above-mentioned electronic device 702 may include a flex tent mode or a flex mode for displaying content using the second display 722.

According to an embodiment, the electronic device 702 may display the home screen in the landscape mode in the flex mode of the electronic device 702, thus removing inconvenience where the user should separately change the setting of the rotation mode for the home screen and improving user experience.

Figure 7C:
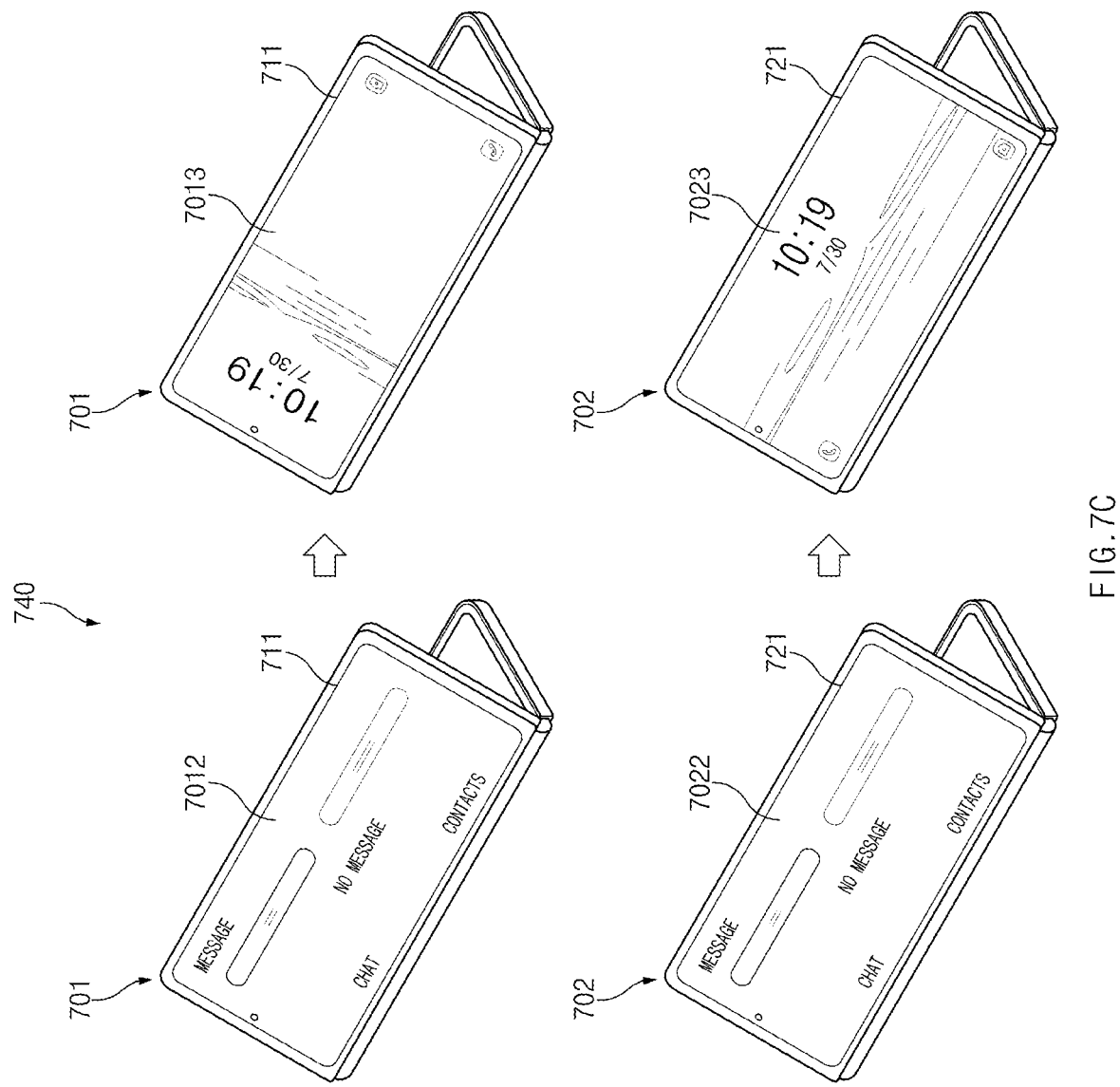

FIG. 7C is a diagram 740 comparing methods for displaying lock screens after the screen timed out while a conventional electronic device and an electronic device display an execution screen of an application in a flex mode according to various embodiments.

Referring to FIG. 7C, the electronic device 701 may be displaying an execution screen 7012 of an application (e.g., a message application) on a first display 711 in the landscape mode in the flex mode. When an inactivity state of the first display 711 is maintained over a specified time while displaying the execution screen 7012 of the application, the electronic device 701 may turn off the first display 711. The electronic device 701 may turn on the first display 711 based on a user input to which an operation of turning on the first display 711 is mapped (e.g., a touch input for tapping the first display 711) and may display a lock screen 7013 on the first display 711 as the locking of the electronic device 701 is set. The conventional electronic device 701 may display the lock screen 7013 in the portrait mode in the flex mode.

Referring to FIG. 7C, the electronic device 702 according to an embodiment may be displaying an execution screen 7022 of an application (e.g., a message application) on a first display 721 in the landscape mode in the flex mode. When an inactivity state of the first display 721 is maintained over a specified time while displaying an execution screen 7022 of the application, the electronic device 702 may turn off the first display 721. The electronic device 702 may turn on the first display 721 based on a user input to which an operation of turning on the first display 711 is mapped (e.g., a touch input for tapping the first display 711) and may display a lock screen 7023 on the first display 711 as the locking of the electronic device 702 is set. The electronic device 702 according to an embodiment may display the lock screen 7023 on the first display 721 in the landscape mode depending on identifying that the electronic device 702 is in the flex mode.

FIG. 7C illustrates that the flex mode of the electronic device 702 is the flex cover mode, but not limited thereto. The flex mode of the above-mentioned electronic device 702 may include a flex tent mode or a flex mode for displaying content using the second display 722.

According to an embodiment, the electronic device 702 may provide a lock screen capable of being displayed based on the user input when the screen timed out while running the application in the landscape mode in the flex mode of the electronic device 702 in the landscape mode to maintain connectivity of a landscape mode setting of the screen in the flex mode, thus improving user experience.

Figure 7D:
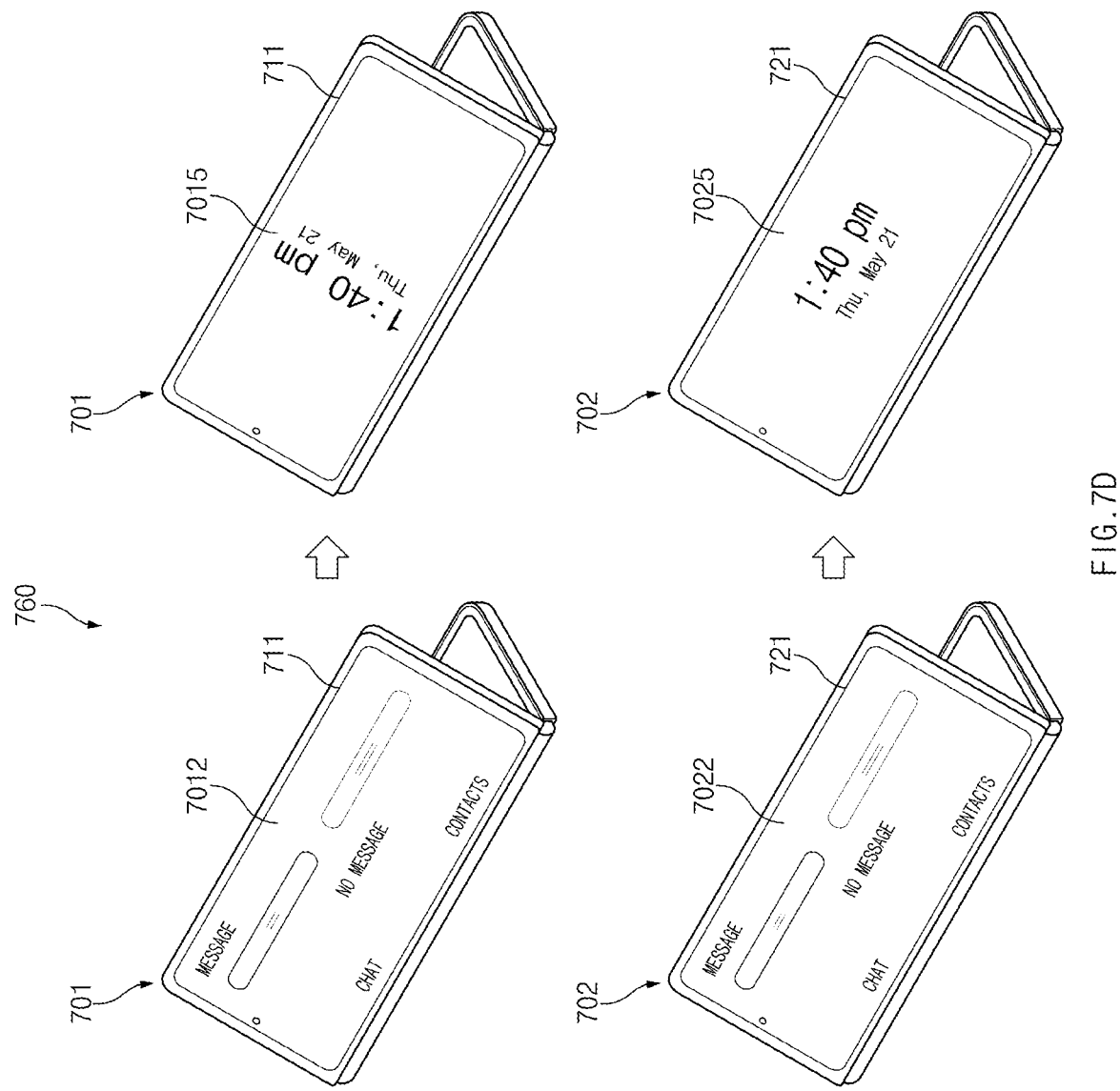

FIG. 7D is a diagram 760 comparing methods for displaying always on display (AOD) screens after the screen timed out while a conventional electronic device and an electronic device display an execution screen of an application in a flex mode according to various embodiments.

Referring to FIG. 7D, the electronic device 701 may be displaying an execution screen 7012 of an application (e.g., a message application) on a first display 711 in the landscape mode in the flex mode. When an inactivity state of the first display 711 is maintained over a specified time while displaying the execution screen 7012 of the application, the electronic device 701 may display an AOD screen 7015 on the first display 711. The conventional electronic device 701 may display the AOD screen 7015 in the portrait mode in the flex mode.

Referring to FIG. 7D, the electronic device 702 according to an embodiment may be displaying an execution screen 7022 of an application (e.g., a message application) on a first display 721 in the landscape mode in the flex mode. When an inactivity state of the first display 721 is maintained over a specified time while displaying the execution screen 7022 of the application, the electronic device 702 may display an AOD screen 7025 on the first display 721. The electronic device 702 according to an embodiment may display the AOD screen 7025 on the first display 721 in the landscape mode depending on identifying that the electronic device 702 is in the flex mode.

FIG. 7D illustrates that the flex mode of the electronic device 702 is the flex cover mode, but not limited thereto. The flex mode of the above-mentioned electronic device 702 may include a flex tent mode or a flex mode for displaying content using the second display 722.

According to an embodiment, the electronic device 702 may provide an AOD screen in the landscape mode when the screen timed out while running the application in the landscape mode in the flex mode of the electronic device 702 in the landscape mode to maintain connectivity of a landscape mode setting of the screen in the flex mode, thus improving user experience.

Figure 7E:
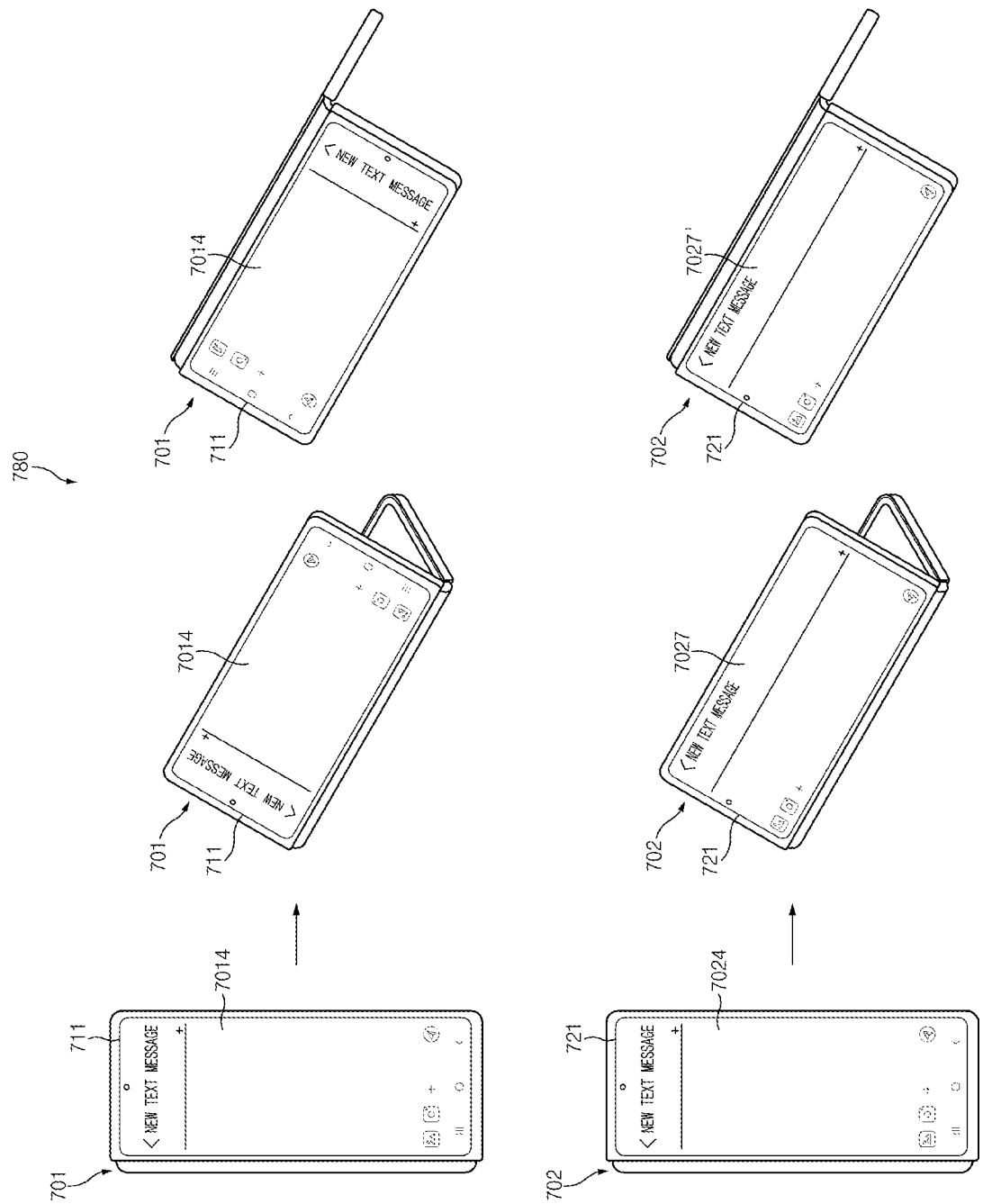

FIG. 7E is a diagram 780 comparing methods for displaying screens as a conventional electronic device and an electronic device detect a geometric deformation event while displaying an execution screen of an application according to various embodiments. It is assumed that settings of rotation modes of a conventional electronic device 701 and an electronic device 702 according to an embodiment, which are shown in FIG. 7E, are a portrait fixing mode.

Referring to FIG. 7E, the electronic device 701 may be displaying an execution screen 7014 of an application (e.g., a message application) on a first display 711 in a portrait mode in a fully folded state. As the electronic device 701 is unfolded in the fully folded state, it may change to the flex mode. The electronic device 701 may display an execution screen 7014 of the application using the first display 711 continuously as it is not unfolded over the specified angle. As the setting of the rotation mode of the electronic device 701 is the portrait fixing mode, the electronic device 701 may display the execution screen 7014 of the application in the portrait mode even in the flex mode.

Referring to FIG. 7E, the electronic device 702 according to an embodiment may be displaying an execution screen 7024 of an application (e.g., a message application) on a first display 721 in the fully folded state. The electronic device 702 according to an embodiment may obtain folding angle information depending on detecting the unfolding operation of the electronic device 702 and may identify that the electronic device 702 changes to the flex mode based on the folding angle. As the electronic device 720 according to an embodiment is not unfolded over the specified angle, it may display an execution screen 7027 of the application using the first display 711 continuously as it is not unfolded over the specified angle. For example, the electronic device 702 may be in the flex cover mode or the flex tent mode. As the electronic device 702 according to an embodiment changes to the flex mode, it may display the execution screen 7027 of the application in the landscape mode. According to an embodiment, as the electronic device 702 changes from the flex cover mode to the flex tent mode, it may invert and display an execution screen 7027' of the application.

Hereinafter, a description will be given of a user interface provided to set an electronic device to change a display mode of a screen in response to a geometric deformation event according to various embodiments.

Figure 8:
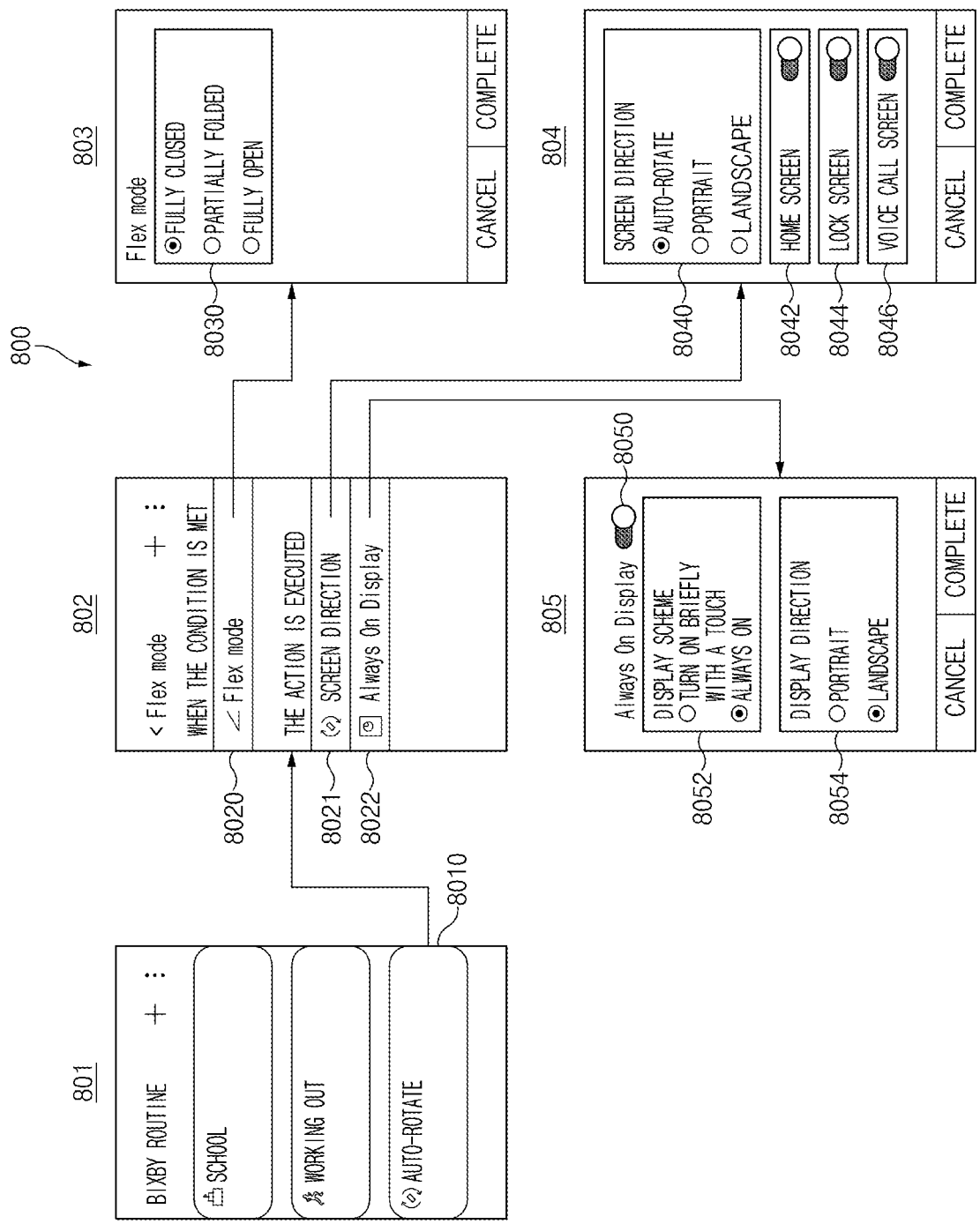
FIG. 8 is a diagram illustrating an example user interface provided by an electronic device according to various embodiments.

FIG. 8 is a diagram 800 illustrating an example user interface provided by an electronic device according to various embodiments. Operations of an electronic device (e.g., an electronic device 401 of FIG. 4), which will be described below, may be performed by a processor (e.g., a processor 430 of FIG. 4) of the electronic device. The electronic device may display user interfaces, which will be described below, on a display (e.g., a display 410 of FIG. 4) to provide a user with them.

According to an embodiment, the electronic device may analyze a usage pattern of a terminal and may provide a first UI 801 which is a user interface for setting a routine to automatically change a function which is frequently changed in a specific condition.

The electronic device may recommend one or more routines with high availability by means of the first UI 801. The electronic device may recommend an auto-rotate routine 8010 capable of setting a condition for automatically rotating a screen and setting one or more operations executed upon meeting the condition by means of the first UI 801.

According to an embodiment, the electronic device may provide a second UI 802 depending on receiving a user input for selecting the auto-rotate routine 8010 by means of the first UI 801. According to an embodiment, the electronic device may set a first condition 8020 and one or more operations (a first operation 8021 and a second operation 8022) to be executed when the first condition 8020 is met based on a setting input of the user, which is input through the second UI 802.

According to an embodiment, the electronic device may provide a third UI 803 depending on receiving a user input for selecting the first condition 8020 through the second UI 802. For example, the third UI 803 may include a condition setting UI 8030 for setting a condition in which a screen direction of the electronic device rotates.

According to an embodiment, the electronic device may display a condition list based on a geometric deformation event detected by means of a sensor (e.g., a sensor 420 of FIG. 4) by the electronic device through the condition setting UI 8030. The condition list based on the geometric deformation event may include, for example, a "partially folded" mode (or a flex mode) identified as it is determined that the folding angle of the electronic device belongs to a specified range of greater than 0 degree and less than 180 degrees, a "fully closed" mode identified as it is determined that the folding angle of the electronic device is 0 degree, or a "fully open" mode identified as it is determined that the folding angle of the electronic device is 180 degrees.

According to an embodiment, the electronic device may set "being in a partially folded mode (a flex mode)" to the first condition 8020 based on a selection input of the user, which is input through the condition setting UI 8030.

According to an embodiment, the electronic device may set the first operation 8021 and the second operation 8022 to be executed when the first condition 8020 is met by means of the second UI 802. For example, the first operation 8021 may be an operation of changing a setting about a screen direction, and the second operation 8022 may be an operation of changing a setting about an AOD function.

According to an embodiment, the electronic device may provide a fourth UI 804 depending on receiving a user input for selecting the first operation 8021 through the second UI 802 and may provide a fifth UI 805 depending on receiving a user input for selecting the second operation 8022.

For example, the fourth UI 804 may include a screen direction setting UI 8040 for setting a screen direction of the electronic device when the first condition 8020 is met based on the setting input of the user, a home screen setting UI 8042 for selecting whether to apply a setting value set through the screen direction setting UI 8040 to the home screen in the same manner, a lock screen setting UI 8044 for selecting whether to apply a setting value through the screen direction setting UI 8040 to the lock screen in the same manner, and a voice call screen setting UI 8046 for selecting whether to apply a setting value through the screen direction setting UI 8040 to the voice call screen in the same manner.

According to an embodiment, the electronic device may set the display mode of the screen of the at least one application to any one of an auto rotation mode, a portrait mode, or a landscape mode when the first condition is met based on the selection input of the user, which is input through the screen direction setting UI 8040. For example, the electronic device may set the display mode of the screen to the auto rotation mode when the first condition is met.

According to an embodiment, the electronic device may set whether to apply the display mode set through the screen direction setting UI 8040 in the same manner even when displaying the home screen based on the selection input of the user, which is input through the home screen setting UI 8042. For example, the electronic device may set the display mode of the home screen to the auto rotation mode when the first condition is met.

According to an embodiment, the electronic device may set whether to apply the display mode set through the screen direction setting UI 8040 in the same manner even when displaying the lock screen based on the selection input of the user, which is input through the lock screen setting UI 8044. For example, the electronic device may set the display mode of the lock screen to the auto rotation mode when the first condition is met.

According to an embodiment, the electronic device may set whether to apply the display mode set through the screen direction setting UI 8040 in the same manner even when displaying the voice call screen based on the selection input of the user, which is input through the voice call screen setting UI 8046. For example, the electronic device may be set not to apply the display mode set through the screen direction setting UI 8040 to the voice call screen in the same manner, by means of the voice call screen setting UI 8046. The electronic device may determine a display mode of the voice call screen depending on a default setting of the rotation mode of the electronic device when the first condition is met.

For example, the fifth UI 805 may include an AOD enable setting UI 8050 for setting whether to enable an AOD function of the electronic device when the first condition 8020 is met based on the setting input of the user, an AOD display scheme setting UI 8052 for setting a display scheme when the AOD function is executed, and an AOD display direction setting UI 8054 for setting a display direction when the AOD function is executed.

According to an embodiment, the electronic device may set whether to enable the AOD function when the first condition is met based on the selection input of the user, which is input through the AOD enable setting UI 8050. For example, the electronic device may set the AOD function to be enabled when the first condition is met.

According to an embodiment, the electronic device may set whether to turn on an AOD screen by a specified time based on the touch input of the user or whether to always turn on the AOD screen when the execution condition of the AOD function is met, based on the selection input of the user, which is input through the AOD display scheme setting UI 8052. For example, the electronic device may set the AOD screen to be always displayed when the first condition and the execution condition of the AOD function are met.

According to an embodiment, the electronic device may set the display mode of the AOD screen to a portrait mode to a landscape mode based on the selection input of the user, which is input through the AOD display direction setting UI 8054. For example, the electronic device may set the display mode of the AOD screen to the landscape mode when the first condition and the execution condition of the AOD function are met.

The electronic device set according to the above-described embodiment may display a screen of at least one application, a home screen, and a lock screen in the landscape mode or the portrait mode based on the rotation state of the electronic device as the electronic device changes to the flex mode and may display the AOD screen in the landscape mode as the AOD function is executed in the flex mode.

The operation of setting the screen direction (or the display mode of the screen) and changing the AOD function setting as the electronic device changes to the flex mode is described as an example in the above-mentioned embodiment, but the condition or the operation executed when the condition is met are not limited thereto.

The method for setting the screen direction to be changed under the condition of the flex mode by means of the Bixby routine UI (e.g., the first UI 801) in the electronic device is described as an example, but not limited thereto. The electronic device may enter the second UI 802 through the setting menu UI of the electronic device.

According to various embodiments, the electronic device may display a fast setting button capable of whether to apply a screen direction setting under the condition of the flex mode, which is set through second to fifth UIs 802 to 805, on a notification panel. For example, when receiving a specified user input (e.g., long press) on the fast setting button, the electronic device may enter the second UI 802.

Hereinafter, a description will be given of a method for operating a screen in response to geometric deformation in the electronic device according to various embodiments, which is set through a user interface shown in FIG. 8, with reference to FIGS. 9A, 9B and 9C. When in the flex mode, the electronic device according to an embodiment, which is set through the user interface shown in FIG. 8, may display the screen in the landscape mode or the portrait mode based on the rotation state of the electronic device.

Figure 9B:
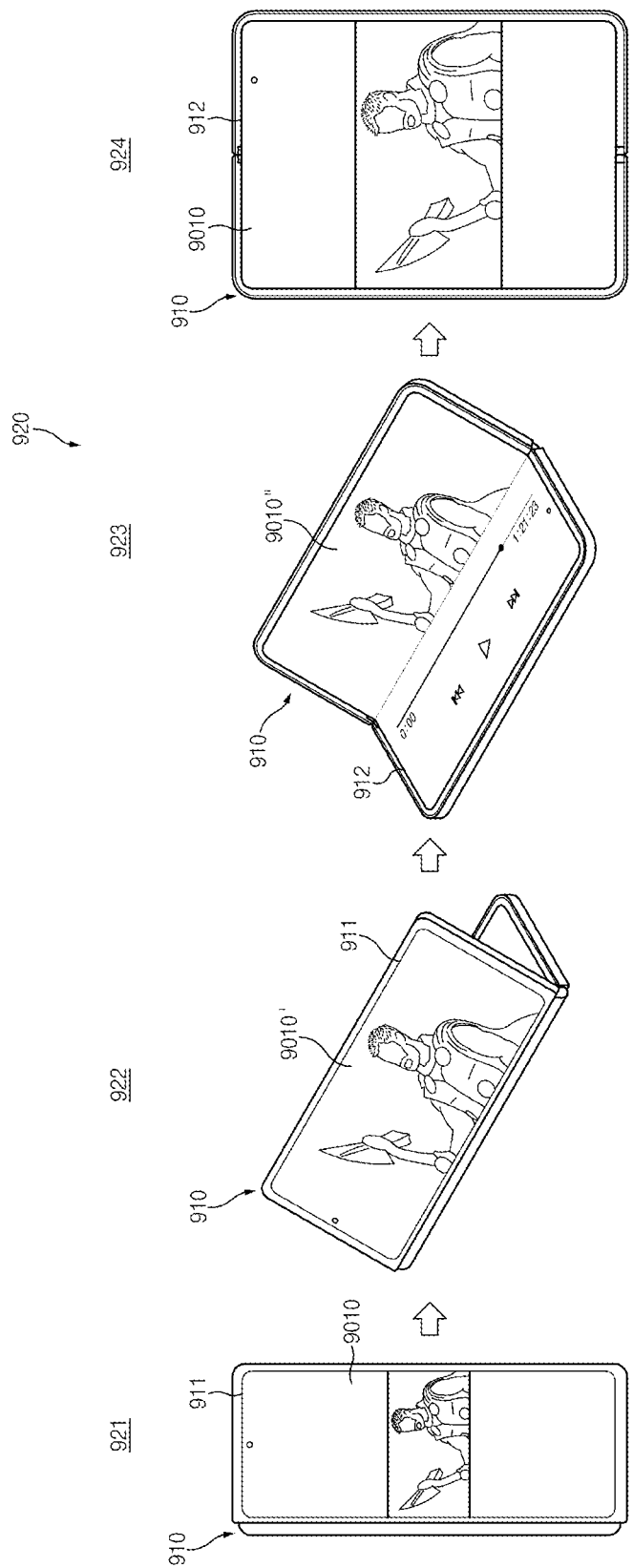
Figure 9C:
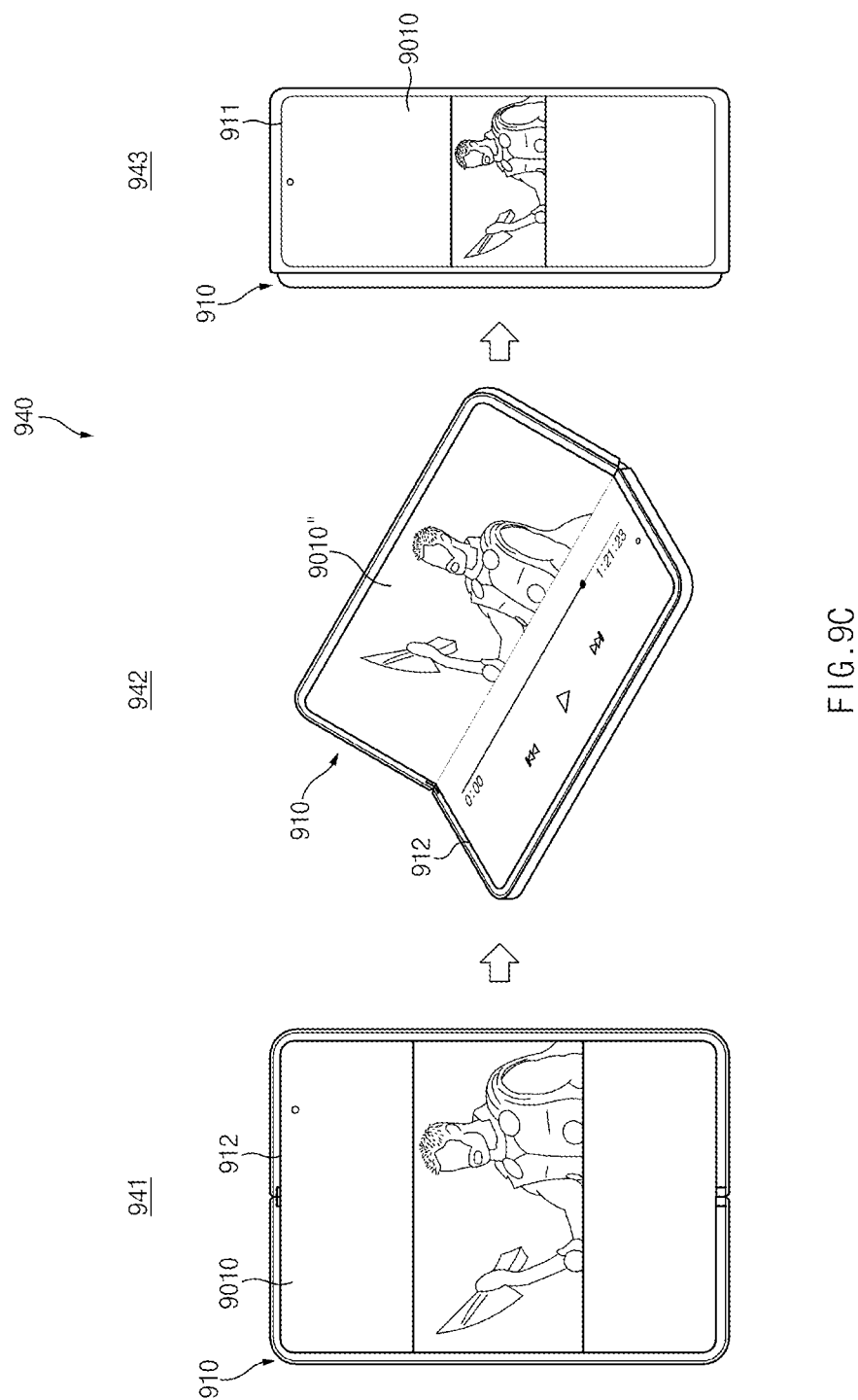

FIGS. 9A, 9B and 9C are diagrams 900, 920, and 940 illustrating an example operation of an electronic device, which is set through a user interface shown in FIG. 8 according to various embodiments. Operations of an electronic device 910 (e.g., an electronic device 401 of FIG. 4), which will be described below, may be performed by a processor (e.g., a processor 430 of FIG. 4) of the electronic device 910. The electronic device 910 according to an embodiment, which will be described below, may have a form factor of a foldable electronic device 201 shown in FIGS. 2 and 3.

Referring to FIG. 9A, in a first state 901, the electronic device 910 may be a fully unfolded state. According to an embodiment, a setting of a rotation mode of the electronic device 910 may be a portrait fixing mode. According to an embodiment, the electronic device 910 may display an execution screen 9010 of an application (e.g., a video playback application) on a second display 912. According to an embodiment, as the setting of the rotation mode of the electronic device 910 is the portrait fixing mode, the electronic device 910 may display the execution screen 9010 of the application in the portrait mode on the second display 912. According to an embodiment, the electronic device 910 may store state information of the electronic device 910 in a first state 901. For example, the electronic device 910 may store state information in the first state 901 of the electronic device 910, the setting of the rotation mode of which is the portrait fixing mode in the state where the electronic device 910 is fully unfolded, which displays the execution screen 9010 of the application in the portrait mode.

According to an embodiment, as the electronic device 910 is folded in the first state 901, it may change to a flex mode in a second state 902. For example, the electronic apparatus 910 may change to a flex cover mode.

In the second state 902, the electronic device 910 may determine that the first condition that "the electronic device 910 is in the flex mode" is met. According to an embodiment, as the first condition is met, the electronic device 910 may execute a first operation of setting the display mode of the screen to a landscape mode. As the first operation is executed, the electronic device 910 may display an execution screen 9010' of the application in the landscape mode.

According to an embodiment, as the electronic device 910 is unfolded in the second state 902, it may change to a fully unfolded state in a third state 903. For example, that the electronic device 910 changes to the third state 903 may refer, for example, to the electronic device 910 being restored to the first state 901.

In the third state 903, the electronic device 910 may determine that the first condition that "the electronic device 910 is in the flex mode" is released. According to an embodiment, as the first condition is released, the electronic device 910 may restore the electronic device 910 to the first state 901 based on the state information of the electronic device 910, which is stored in the first state 901. For example, the electronic device 910 may change the setting of the rotation mode to the portrait fixing mode and may display the execution screen 9010 of the application in the portrait mode.

Referring to FIG. 9B, in a first state 921, the electronic device 910 may be in a fully folded state. According to an embodiment, a setting of a rotation mode of the electronic device 910 may be a portrait fixing mode. According to an embodiment, the electronic device 910 may display the execution screen 9010 of the application (e.g., the video playback application) on the first display 911. According to an embodiment, as the setting of the rotation mode of the electronic device 910 is the portrait fixing mode, the electronic device 910 may display the execution screen 9010 of the application on the first display 911 in the portrait mode. According to an embodiment, the electronic device 910 may store state information of the electronic device 910 in the first state 921. For example, the electronic device 901 may store state information that the setting of the rotation mode of the electronic device 910 is the portrait fixing mode.

According to an embodiment, as the electronic device 910 is unfolded in the first state 921, it may change to a flex cover mode in a second state 922. In the second state 922, the electronic device 910 may determine that the first condition that "the electronic device 910 is in the flex mode" is met. According to an embodiment, as the first condition is met, the electronic device 910 may execute a first operation of setting the display mode of the screen to a landscape mode. As the first operation is executed, the electronic device 910 may display an execution screen 9010' of the application in the landscape mode.

According to an embodiment, as the electronic device 910 is unfolded over the specified angle in the second state 922, it may identify that the display displaying content switches from a first display 911 to a second display 912. In third second state 923, the electronic device 910 may determine that a second condition that "the electronic device 910 is the flex mode and the second display 912 is enabled" is met. According to an embodiment, when the second condition is met, the electronic device 910 may determine that the first condition is also met. According to an embodiment, as the second condition is met, the electronic device 910 may execute a first operation of the second condition, which sets the display mode of the screen to the flex mode. As the first operation of the second condition is executed, the electronic device 910 may display an execution screen 9010" of the application in the flex mode. According to an embodiment, when the folding angle of the electronic device 910 is a specified angle range (e.g., 80 degrees to 130 degrees), the flex mode may refer to a mode for providing a UI optimized the flex mode where the electronic device 910 displays content using the second display 912. For example, the electronic device 910 may play a video on the display area of the erected second display 912 and may display a UI for controlling the playback of the video on the display area of the lying second display 912.

According to an embodiment, as the electronic device 910 is unfolded in the third state 923, it may change to a fully unfolded state in a fourth state 924. In the fourth state 924, the electronic device 910 may determine that the first condition that "the electronic device 910 is in the flex mode" is released. According to an embodiment, when the first condition is released, the electronic device 910 may determine that the second condition is also released. According to an embodiment, as the first condition is released, the electronic device 910 may restore the electronic device 910 to the first state 921 based on the state information of the electronic device 910, which is stored in the first state 921. For example, the electronic device 910 may change the setting of the rotation mode to the portrait fixing mode and may display the execution screen 9010 of the application in the portrait mode.

Referring to FIG. 9C, in a first state 941, the electronic device 910 may be in a fully unfolded state. According to an embodiment, a setting of a rotation mode of the electronic device 910 may be the portrait fixing mode. According to an embodiment, the electronic device 910 may display an execution screen 9010 of an application (e.g., a video playback application) on a second display 912. According to an embodiment, as the setting of the rotation mode of the electronic device 910 is the portrait fixing mode, the electronic device 910 may display the execution screen 9010 of the application on the second display 912 in the portrait mode. According to an embodiment, the electronic device 910 may store state information of the electronic device 910 in the first state 901. For example, the electronic device 910 may store state information that the setting of the rotation mode of the electronic device 910 is the portrait fixing mode.

According to an embodiment, as the electronic device 910 is folded in the first state 941, it may change to a flex mode in a second state 942. In the second state 922, the electronic device 910 may determine that a second condition that "the electronic device 910 is the flex mode and the second display 912 is enabled" is met. According to an embodiment, when the second condition is met, the electronic device 910 may determine that the first condition is also met. According to an embodiment, as the second condition is met, the electronic device 910 may execute a first operation of the second condition, which sets the display mode of the screen to the flex mode. As the first operation of the second condition is executed, the electronic device 910 may display an execution screen 9010" of the application in the flex mode. As described above, when the folding angle of the electronic device 910 is a specified angle range (e.g., 80 degrees to 130 degrees), the flex mode may refer to a mode for providing a UI optimized for the flex mode where the electronic device displays content using the second display 912. For example, the electronic device 910 may play a video on the display area of the erected second display 910 and may display a UI for controlling the playback of the video on the display area of the lying second display 912.

According to an embodiment, as the electronic device 910 is unfolded in the second state 942, it may change to a fully folded state in a third state 943. In the third state 943, the electronic device 910 may determine that the second condition that "the electronic device 910 is the flex mode and the second display 912 is enabled" is released. According to an embodiment, when the second condition is released, the electronic device 910 may determine that the first condition is also released. According to an embodiment, as the second condition is released, the electronic device 910 may restore the electronic device 910 to the first state 941 based on the state information of the electronic device 910, which is stored in the first state 941. For example, the electronic device 910 may change the setting of the rotation mode to the portrait fixing mode and may display the execution screen 9010 of the application in the portrait mode.

Hereinafter, a description will be given of a method for changing a display mode of a screen in response to geometric deformation while an electronic device displays execution screens of a plurality of applications in a multi-window mode according to various embodiments with reference to FIG. 10.

Figure 10:
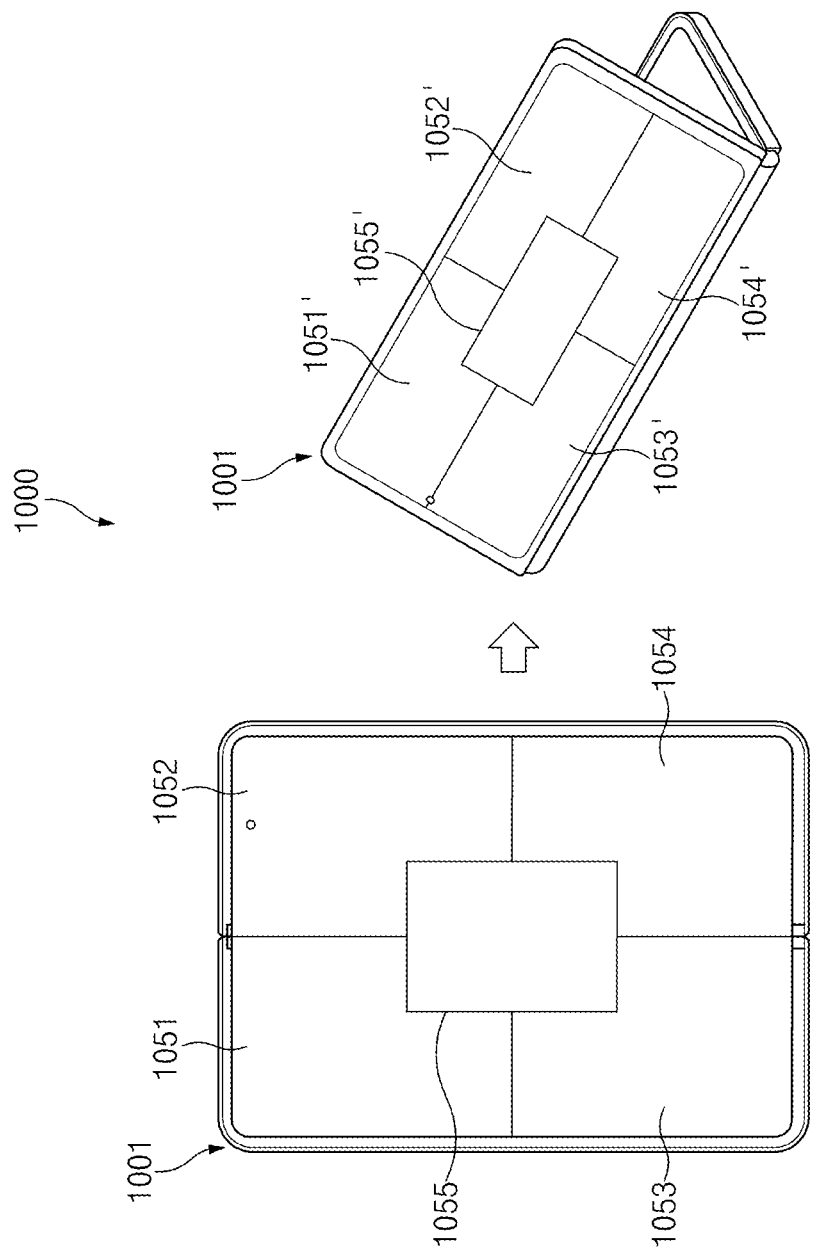
FIG. 10 is a diagram illustrating an example operation of an electronic device in a multi-window mode according to various embodiments.

FIG. 10 is a diagram 1000 illustrating an example operation of an electronic device in a multi-window mode according to an embodiment. Operations of an electronic device 1001 (e.g., an electronic device 401 of FIG. 4), which will be described below, may be performed by a processor (e.g., a processor 430 of FIG. 4) of the electronic device 1001. The electronic device 1001 according to an embodiment, which will be described below, may have a form factor of a foldable electronic device 201 shown in FIGS. 2 and 3.

Referring to FIG. 10, the electronic device 1001 may display execution screens of a plurality of applications in the multi-window mode on a second display 1011. For example, the electronic device 1001 may configure a multi-window layout including a first window 1051, a second window 1052, a third window 1053, and a fourth window 1054 in which the full screen is split into four and a fifth window 1055 which is one pop-up window and may map each of the plurality of applications to each window to display the execution screens of the plurality of applications in the multi-window mode.

As the electronic device 1001 determines that the folding angle belongs to a specified range of greater than 0 degree and less than 180 degrees, it may determine display modes of the plurality windows as a landscape mode. According to an embodiment, the electronic device 1001 may reconfigure the first window 1051, the second window 1052, the third window 1053, the fourth window 1054, and the fifth window 1055 at a size of the display in the landscape mode or a size optimized for an aspect ratio of the display depending on identifying that the electronic device 1001 changes to the flex mode.

According to an embodiment, as the electronic device 1001 changes to the flex mode, it may display the execution screens of the plurality of applications in the multi-window mode depending on a multi-window layout including the reconfigured first window 1051', the reconfigured second window 1052', the reconfigured third window 1053', the reconfigured fourth window 1054', and the reconfigured fifth window 1055'.

According to an embodiment, as the electronic device 1001 changes to the flex mode, it may change the display modes of the plurality of windows making up the multi-window mode to the landscape mode, thus removing the inconvenience of having to separately change the setting of the rotation mode of each of the execution screens of the plurality of applications to the landscape mode in the multi-window mode.

Hereinafter, a description will be given of a method for changing a display mode of a screen in response to geometric deformation when an electronic device includes a rollable display according to various embodiments with reference to FIG. 11.

Figure 11:
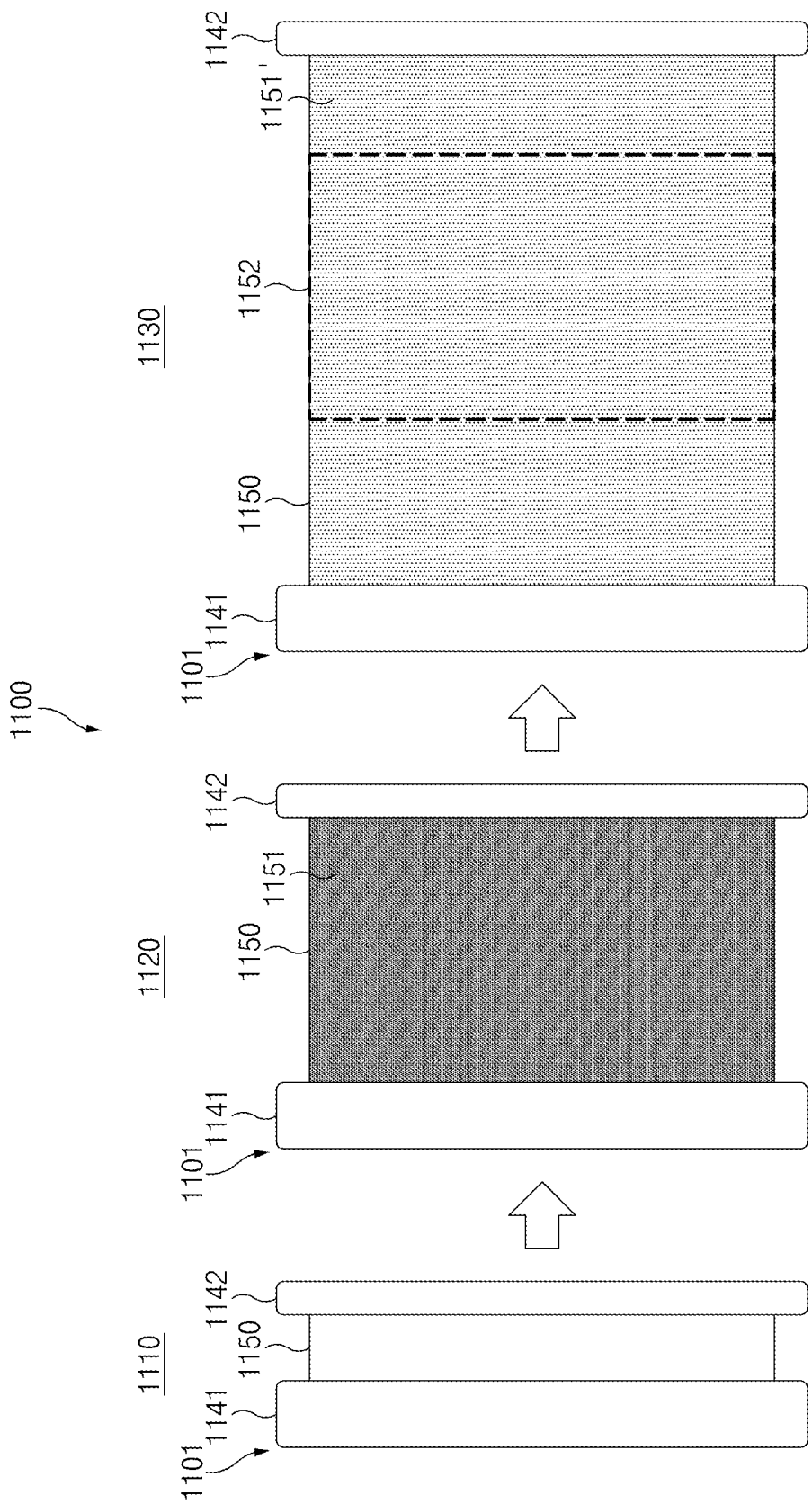
FIG. 11 is a diagram illustrating an example operation of an electronic device including a rollable display according to various embodiments.

FIG. 11 is a diagram 1100 illustrating an example operation of an electronic device, including a rollable display according to various embodiments. Operations of an electronic device 1101 (e.g., an electronic device 401 of FIG. 4), which will be described below, may be performed by a processor (e.g., a processor 430 of FIG. 4) of the electronic device 1101.

According to an embodiment, the electronic device 1101 may include a first housing 1141, a second housing 1142, and a display 1150. According to an embodiment, the display 1150 may be a rollable display. According to an embodiment, the display 1150 or a display area of the display 1150 may be expanded in size as the distance between the first housing 1141 and the second housing 1142 increases, and the display 1150 or the display area of the display 1150 may be reduced in size as the distance between the first housing 1141 and the second housing 1142 decreases.

According to an embodiment, the electronic device 1101 may detect that the size of the display 1150 changes as the distance between the first housing 1141 and the second housing 1142 increases by means of a sensor (e.g., a sensor 420 of FIG. 4). The electronic device 1101 may obtain an aspect ratio of the display 1150 depending on detecting that the size of the display 1150 changes.

According to an embodiment, as it is determined that the aspect ratio (landscape/portrait) is greater than or equal to a threshold, the electronic device 1101 may determine a display mode of an execution screen of at least one application, which is displayed on the display 1150, as a landscape mode and may map the determined display mode to the at least one application.

According to an embodiment, the electronic device 1101 may display the execution screen of the at least one application on the display 1150 in the landscape mode.

In a first state 1110, the distance between the first housing 1141 and the second housing 1142 of the electronic device 1101 may be less than a threshold distance for enabling the display 1150.

In a second state 1120, as the distance between the first housing 1141 and the second housing 1142 of the electronic device 1101 is greater than or equal to the threshold distance for enabling the display 1150, the display 1150 may be enabled. According to an embodiment, the electronic device 1101 may display an execution screen 1051 of the at least one application on the display 1150.

According to an embodiment, the aspect ratio (e.g., landscape/portrait) of the display 1150 in the second state 1120 may be less than the threshold. As the aspect ratio (e.g., landscape/portrait) of the display 1150 is less than the threshold, the electronic device 1101 may display the execution screen 1051 of the at least one application in a portrait mode.

The distance between the first housing 1141 and the second housing 1142 of the electronic device 1101 in the third state 1130 may be longer than the distance between the first housing 1141 and the second housing 1142 of the electronic device 1101 in the second state 1120. According to an embodiment, the aspect ratio (e.g., landscape/portrait) of the display 1150 in the third state 1130 may be greater than or equal to the threshold. As the aspect ratio (e.g., landscape/portrait) of the display 1150 is greater than or equal to the threshold, the electronic device 1101 may display an execution screen 1051' of the at least one application in the landscape mode.

Because a conventional electronic device does not control a display mode of a screen in response to a change in size of the display 1150, the electronic device 1101 has a problem where it does not provide a screen optimized according a variable size of the display 1150, because it is able to display the execution screen of the application in only the portrait mode corresponding to the first area 1152 although it changes to the third state 1130.

According to an embodiment, the electronic device 1101 may obtain aspect ratio information of the display 1150 in response to the change in size of the display 1150 and may automatically change the display mode of the screen displayed on the display 1150 to the landscape mode without a separate user input as it is determined that the aspect ratio of the display 1150 is greater than or equal to the threshold, thus improving user experience.

According to an example embodiment, an electronic device (e.g., an electronic device 101 of FIG. 1, an electronic device 201 of FIGS. 2 and 3, an electronic device 401 of FIG. 4, an electronic device 702 of FIGS. 7A to 7E, an electronic device 910 of FIGS. 9A to 9C, an electronic device 1001 of FIG. 10, or an electronic device 1101 of FIG. 11) may include: a display (e.g., a display module 160 of FIG. 1, a first display 211 of FIGS. 2 and 3, a second display 212 of FIGS. 2 and 3, a display 410 of FIG. 4, a first display 721 of FIGS. 7A to 7E, a second display 722 of FIGS. 7A to 7E, a first display 911 of FIGS. 9A to 9C, a second display 912 of FIGS. 9A to 9C, a first display 1011 of FIG. 10, a second display 1012 of FIG. 10, or a display 1150 of FIG. 11), a sensor (e.g., a sensor module 176 of FIG. 1 or a sensor 420 of FIG. 4) configured to sense geometric deformation of the electronic device, at least one processor (e.g., a processor 120 of FIG. 1 or a processor 430 of FIG. 4), and a memory (e.g., a memory 130 of FIG. 1 or a memory 410 of FIG. 4) operatively connected with the at least one processor and including at least one application. The memory may include one or more instructions which, when executed, cause the at least one processor to: control the display to display an execution screen of the at least one application on the display in response to execution of the at least one application stored in the memory, identify a setting of a rotation mode of the electronic device, obtain display feature information of the display in response to a geometric deformation event sensed by the sensor, determine a display mode of the execution screen based on the display feature information and the identified setting of the rotation mode and map the determined display mode to the at least one application, and control the display to display the execution screen on the display based on the mapped display mode.

According to an example embodiment, the geometric deformation event may include at least one of folding, unfolding, rotation, or a change in size of the display.

According to an example embodiment, the rotation mode may include an auto rotation mode configured to change the display mode based on rotation of the electronic device and a portrait fixing mode configured to fix the display mode to a portrait mode.

According to an example embodiment, the display may include: a first display and a second display disposed in a housing of the electronic device to face in an opposite direction to the first display wherein the second display is flexible. The instructions, when executed, may cause the processor to: identify a folding angle of the display in response to a folding operation or an unfolding operation sensed by the sensor, and determine the display mode to a landscape mode in response to determining that the folding angle is in a specified range of greater than 0 degrees and less than 180 degrees.

According to an example embodiment, the instructions, when executed, may cause the processor to: determine the display mode to the portrait mode in response to the setting of the rotation mode being the portrait fixing mode and determining that the folding angle deviates from the specified range.

According to an example embodiment, the instructions, when executed, may cause the processor to determine the display mode based on a rotation state of the electronic device in response to the setting of the rotation mode being the auto rotation mode and determining that the folding angle deviates from the specified range.

According to an example embodiment, the execution screen may include at least one of a home screen, a lock screen, an always on display (AOD) screen, or a voice call screen.

According to an example embodiment, the memory may include one or more instructions which, when executed, cause the processor to: control the display to display a user interface (UI), for setting a condition associated with the geometric deformation and an operation to be executed according to the condition being met, on the display, and change a setting of the electronic device based on an input received through the UI.

According to an example embodiment, the instructions, when executed, may cause the processor to: determine the display mode of a plurality of windows as the landscape mode in response to determining that the folding angle is within the specified range, while displaying the execution screen in a multi-window mode including the plurality of windows on the display.

According to an example embodiment, the instructions, when executed, may cause the processor to: identify an aspect ratio of the display in response to a change in size of the display is sensed by the sensor, and determine the display mode as a landscape mode in response to determining that the aspect ratio is greater than or equal to a specified range.

According to an example embodiment, a method of operating a screen of an electronic device (e.g., an electronic device 101 of FIG. 1, an electronic device 201 of FIGS. 2 and 3, an electronic device 401 of FIG. 4, an electronic device 702 of FIGS. 7A to 7E, an electronic device 910 of FIGS. 9A to 9C, an electronic device 1001 of FIG. 10, or an electronic device 1101 of FIG. 11) including a display (e.g., a display module 160 of FIG. 1, a first display 211 of FIGS. 2 and 3, a second display 212 of FIGS. 2 and 3, a display 410 of FIG. 4, a first display 721 of FIGS. 7A to 7E, a second display 722 of FIGS. 7A to 7E, a first display 911 of FIGS. 9A to 9C, a second display 912 of FIGS. 9A to 9C, a first display 1011 of FIG. 10, a second display 1012 of FIG. 10, or a display 1150 of FIG. 11) may include: displaying an execution screen of at least one application in response to execution of the at least one application, identifying a setting of a rotation mode of the electronic device, obtaining display feature information of the display in response to a geometric deformation event sensed by a sensor (e.g., a sensor module 176 of FIG. 1 or a sensor 420 of FIG. 4) of the electronic device, determining a display mode of the execution screen based on the display feature information and the identified setting of the rotation mode and mapping the determined display mode to the at least one application, and displaying the execution screen on the display based on the mapped display mode.

According to an example embodiment, the geometric deformation event may include at least one of folding, unfolding, rotation, or a change in size of the display.

According to an example embodiment, the rotation mode may include an auto rotation mode configured to change the display mode based on rotation of the electronic device and a portrait fixing mode configured to fix the display mode to a portrait mode.

According to an example embodiment, the display may include a first display and a second display disposed in a housing of the electronic device to face in an opposite direction to the first display, wherein the second display is flexible. The method may further include: identifying a folding angle of the display, in response to a folding operation or an unfolding operation being sensed by the sensor, and determining the display mode as a landscape mode in response to determining that the folding angle is within a specified range of greater than 0 degree and less than 180 degrees.

According to an example embodiment, the determining of the display mode may include: determining the display mode as the portrait mode in response to the setting of the rotation mode being the portrait fixing mode and determining that the folding angle deviates from the specified range.

According to an example embodiment, the determining of the display mode may include: determining the display mode based on a rotation state of the electronic device, in response to the setting of the rotation mode being the auto rotation mode and determining that the folding angle deviates from the specified range.

According to an example embodiment, the execution screen may include a home screen, a lock screen, an always on display (AOD) screen, or a voice call screen.

According to an example embodiment, the method may further include displaying a user interface (UI), for setting a condition associated with the geometric deformation and an operation to be executed according to the condition being met, on the display, and changing a setting of the electronic device based on an input received through the user interface.

According to an example embodiment, the determining of the display mode may include: determining the display mode of a plurality of windows as a landscape mode in response to determining that the folding angle is within the specified range, while displaying the execution screen in a multi-window mode including the plurality of windows on the display.

According to an example embodiment, the method may further include: identifying an aspect ratio of the display, in response to a change in size of the display being sensed by the sensor, and determining the display mode as a landscape mode in response to determining that the aspect ratio is greater than or equal to a specified range.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a first housing having first and second surfaces facing in opposite directions;
   a second housing having a first surface;
   a hinge coupled between the first housing and the second housing for allowing folding and unfolding of the electronic device so that the first surface of the first housing and the first surface of the second housing face in a same direction in a fully unfolded state and face each other in opposite directions in a fully folded state;
   a display comprising a first display disposed on the second surface of the first housing and a second display disposed on the first surface of the first housing and the first surface of the second housing, wherein the second display is flexible;
   at least one sensor;
   at least one processor comprising processing circuitry; and
   memory operatively connected with the at least one processor and configured to store at least one application,
   wherein the memory stores one or more instructions which, when executed by the at least one processor individually and/or collectively, cause the electronic device to:
   control one of the first display or the second display to display an execution screen of an executed application;
   identify a first setting for setting an execution screen display mode for displaying the execution screen of the application based on rotation of the electronic device while the electronic device is in the fully folded state or the fully unfolded state; and
   based on at least one sensor sensing geometric deformation of the electronic device to have a folding angle between the fully folded state and the fully unfolded state while the electronic device displays the execution screen:
   identify a second setting for setting whether an execution screen display mode prior to the geometric deformation is changed based on the geometric deformation;
   obtain display feature information of the display displaying the execution screen prior to the geometric deformation,
   determine one or the other of the first display or the second display to display the execution screen based on the geometric deformation,
   determine an execution screen display mode for the execution screen on the determined display based on the display feature information and the second setting,
   map the determined execution screen display mode to the application, and
   control to display the execution screen on the determined display based on the mapped display mode.

2. The electronic device of claim 1, wherein the sensor is configured to sense geometric deformation including folding of the electronic device, unfolding of the electronic device, or a change in size of the display of the electronic device.

3. The electronic device of claim 1, wherein the second setting includes an auto mode configured to change the execution screen display mode based on folding angle of the electronic device and a portrait fixing mode configured to fix the execution screen display mode to a portrait mode.

4. The electronic device of claim 3,
   wherein the second setting sets the execution screen display mode to be a landscape mode based on the folding angle being within a range between the fully folded state and the fully unfolded state.

5. The electronic device of claim 4, wherein the memory stores one or more instructions which, when executed by the at least one processor individually and/or collectively, cause the electronic device to:
   determine the execution screen display mode to be the portrait mode in response to the identified first setting being the portrait fixing mode and sensing that the folding angle deviates from the range.

6. The electronic device of claim 4, wherein the memory stores one or more instructions which, when executed by the at least one processor individually and/or collectively, cause the electronic device to:
determine the display mode based on a rotation state of the electronic device in response to the first setting being the auto mode and determining that the folding angle deviates from the range.

7. The electronic device of claim 1, wherein the execution screen includes at least one of a home screen, a lock screen, an always on display (AOD) screen, or a voice call screen.

8. The electronic device of claim 1, wherein the memory stores one or more instructions which, when executed by the at least one processor individually and/or collectively, cause the electronic device to:
control the display to display a user interface (UI) on the display for setting a condition associated with the geometric deformation and an operation to be executed according to the condition being met; and
change a setting of the electronic device based on an input received through the UI.

9. The electronic device of claim 4, wherein the memory stores one or more instructions which, when executed by the at least one processor individually and/or collectively, cause the electronic device to:
determine the execution screen display mode of a plurality of windows as the landscape mode in response to determining that the folding angle is within the range, while displaying the execution screen in a multi-window mode including the plurality of windows.

10. The electronic device of claim 1, wherein the memory stores one or more instructions which, when executed by the at least one processor individually and/or collectively, cause the electronic device to:
identify an aspect ratio of the display in response to a change in size of the display being sensed by the sensor; and
determine the execution screen display mode as a landscape mode in response to determining that the aspect ratio is greater than or equal to a specified aspect ratio.

11. A method of operating a screen of an electronic device including a first housing having first and second surfaces facing in opposite directions, a second housing foldably coupled to the first housing and having a first surface, and a display comprising a first display disposed on the second surface of the first housing and a second display disposed on the first surface of the first housing and the first surface of the second housing, wherein the second display is flexible and wherein the first surface of the first housing and the first surface of the second housing face in a same direction in a fully unfolded state of the electronic device and face each other in opposite directions in a fully folded state of the electronic device, the method comprising:
displaying an execution screen of an executed application on one of the first display or the second display;
identifying a first setting for setting an execution screen display mode for displaying the execution screen of the application based on rotation of the electronic device while the electronic device is in the fully folded state or the fully unfolded state;
based on at least one sensor sensing geometric deformation of the electronic device to have a folding angle between the fully folded state and the fully unfolded state while the electronic device displays the execution screen:

identifying a second setting for setting whether an execution screen display mode prior to the geometric deformation is changed based on the geometric deformation;
obtaining display feature information of the display displaying the execution screen prior to the geometric deformation;
determining one or the other of the first display or the second display to display the execution screen based on the geometric deformation;
determining an execution screen display mode for the execution screen on the determined display based on the display feature information and the second setting and mapping the determined execution screen display mode to the application; and
displaying the execution screen on the determined display based on the mapped display mode.

12. The method of claim 11, wherein the second setting sets the execution screen display mode to be a landscape mode based on the folding angle being within a range between the fully folded state and the fully unfolded state.

13. The method of claim 12, wherein the second setting includes an auto mode configured to change the execution screen display mode based on folding angle of the electronic device and a portrait fixing mode configured to fix the execution screen display mode to a portrait mode, and
wherein the determining of the display mode includes:
determining the execution screen display mode as the portrait mode in response to the first setting and determining that the folding angle deviates from the range; and
determining the execution screen display mode based on a rotation state of the electronic device, in response to the first setting being the auto mode and determining that the folding angle deviates from the range.

14. The method of claim 12, wherein the determining of the display mode includes:
determining the execution screen display mode of a plurality of windows as a landscape mode in response to determining that the folding angle is within the range, while displaying the execution screen in a multi-window mode including the plurality of windows.

15. The method of claim 11, further comprising:
identifying an aspect ratio of the display, in response to the geometric deformation; and
determining the execution screen display mode as a landscape mode in response to identifying that the aspect ratio is greater than or equal to a specified aspect ratio.

16. The method of claim 11, wherein the geometric deformation includes folding of the electronic device, unfolding of the electronic device, or a change in size of the display of the electronic device.

17. The method of claim 11, wherein the execution screen includes at least one of a home screen, a lock screen, an always on display (AOD) screen, or a voice call screen.

18. The method of claim 11, further comprising:
displaying a user interface (UI) on the display for setting a condition associated with the geometric deformation and an operation to be executed according to the condition being met; and
changing a setting of the electronic device based on an input received through the UI.

19. A non-transitory computer-readable medium having recorded thereon computer-executable instructions, which when executed, cause an electronic device, including a first housing having first and second surfaces facing in opposite directions, a second housing foldably coupled to the first housing and having a first surface, and a display comprising a first display disposed on the second surface of the first housing and a second display disposed on the first surface of the first housing and the first surface of the second housing, wherein the second display is flexible and wherein the first surface of the first housing and the first surface of the second housing face in a same direction in a fully unfolded state of the electronic device and face each other in opposite directions in a fully folded state of the electronic device, to perform operations comprising:

displaying an execution screen of an executed application on one of the first display or the second display;

identifying a first setting for setting an execution screen display mode for displaying the execution screen of the application based on rotation of the electronic device while the electronic device is in the fully folded state or the fully unfolded state;

based on at least one sensor sensing geometric deformation of the electronic device to have a folding angle between the fully folded state and the fully unfolded state while the electronic device displays the execution screen:

identifying a second setting for setting whether an execution screen display mode prior to the geometric deformation is changed based on the geometric deformation;

obtaining display feature information of the display displaying the execution screen prior to the geometric deformation;

determining one or the other of the first display or the second display to display the execution screen based on the geometric deformation;

determining an execution screen display mode for the execution screen on the determined display based on the display feature information and the second setting and mapping the determined execution screen display mode to the application; and displaying the execution screen on the determined display based on the mapped display mode.

20. The non-transitory computer-readable medium of claim 19, wherein the second setting sets the execution screen display mode to be a landscape mode based on the folding angle being within a range between the fully folded state and the fully unfolded state.

\* \* \* \* \*